US012672089B2

(12) United States Patent
Si et al.

(10) Patent No.: US 12,672,089 B2
(45) Date of Patent: Jun. 30, 2026

(54) POSITIONING MEASUREMENT WINDOW INDICATION METHOD, TERMINAL, AND NETWORK SIDE DEVICE

(71) Applicant: VIVO MOBILE COMMUNICATION CO., LTD., Dongguan (CN)

(72) Inventors: Ye Si, Dongguan (CN); Yuanyuan Wang, Dongguan (CN); Yuanyuan Wang, Dongguan (CN); Zixun Zhuang, Dongguan (CN); Huaming Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 393 days.

(21) Appl. No.: 18/206,604

(22) Filed: Jun. 6, 2023

(65) Prior Publication Data

US 2023/0319771 A1     Oct. 5, 2023

Related U.S. Application Data

(63) Continuation of application No. PCT/CN2021/137162, filed on Dec. 10, 2021.

(51) Int. Cl.
*H04W 64/00*     (2009.01)
*H04L 5/00*     (2006.01)

(52) U.S. Cl.
CPC ........... *H04W 64/00* (2013.01); *H04L 5/0048* (2013.01)

(58) Field of Classification Search
CPC ........................... H04W 64/00; H04L 5/0048
See application file for complete search history.

(56) References Cited

FOREIGN PATENT DOCUMENTS

| CN | 102595450 A | 7/2012 |
| CN | 107113647 A | 8/2017 |
| CN | 109788497 A | 5/2019 |
| CN | 111106912 A | 5/2020 |
| CN | 111342943 A | 6/2020 |
| CN | 113498092 A | 10/2021 |
| WO | 2020143619 A1 | 7/2020 |
| WO | 2020211094 A1 | 10/2020 |

OTHER PUBLICATIONS

Extended European Search Report issued in related European Application No. 21902729.9, mailed Mar. 13, 2024, 10 pages.
VIVO: "Discussion on potential positioning enhancements", 3GPP Draft; R1-2007666, Nov. 2020, 49 pages.
Qualcomm Incorporated: "Potential Positioning Enhancements for NR Rel-17 Positioning", 3GPP Draft; R1-2008619, Nov. 2020, 17 pages.

(Continued)

*Primary Examiner* — Sam Bhattacharya
(74) *Attorney, Agent, or Firm* — IPX PLLC

(57)     ABSTRACT

A positioning measurement window indication method, a terminal, and a network side device are provided. The method includes: receiving, by a terminal, first indication information. The first indication information is used to trigger, activate, or configure a positioning measurement window, the first indication information is used to cancel triggering, activation, or configuration of a positioning measurement window, or the first indication information is used to update positioning measurement window configuration. The method further includes performing a positioning behavior based on the first indication information.

18 Claims, 5 Drawing Sheets

200

A terminal receives first instruction information, where the first indication information is used to trigger, activate, or configure a positioning measurement window, the first indication information is used to cancel triggering, activation, or configuration of a positioning measurement window, or the first indication information is used to update positioning measurement window configuration ∼S202

Perform a positioning behavior based on the first indication information ∼S204

(56)                References Cited

OTHER PUBLICATIONS

First Office Action issued in related Chinese Application No. 202011440363.9, Apr. 3, 2024, 10 pages.
International Search Report issued in corresponding International Application No. PCT/CN2021/137162, mailed Feb. 22, 2022, 4 pages.
Third Office Action issued in related Chinese Application No. 202011440363.9, Apr. 30, 2025, 10 pages.
Fourth Office Action issued in related Chinese Application No. 202011440363.9, Jul. 31, 2025, 9 pages.

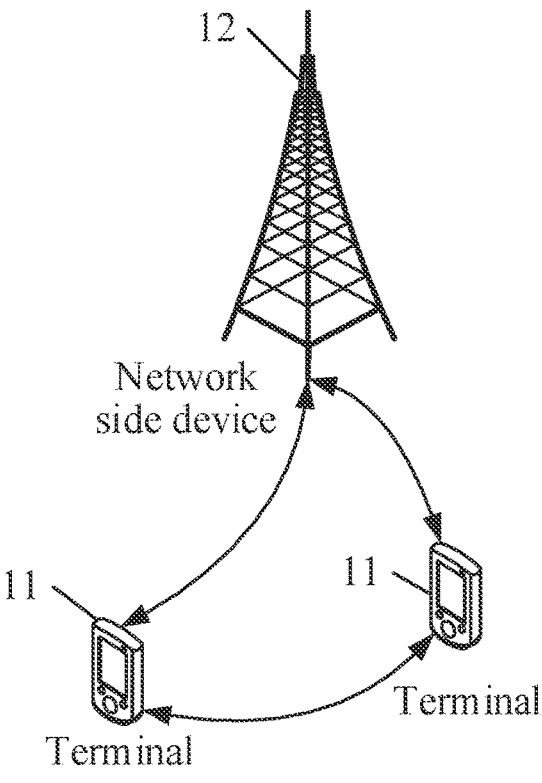

Network
side device

11

11

Terminal

Terminal

A terminal receives first instruction information, where the first
indication information is used to trigger, activate, or configure a
positioning measurement window, the first indication
information is used to cancel triggering, activation, or
configuration of a positioning measurement window, or the first
indication information is used to update positioning
measurement window configuration

~S202

Perform a positioning behavior based on the first indication
information

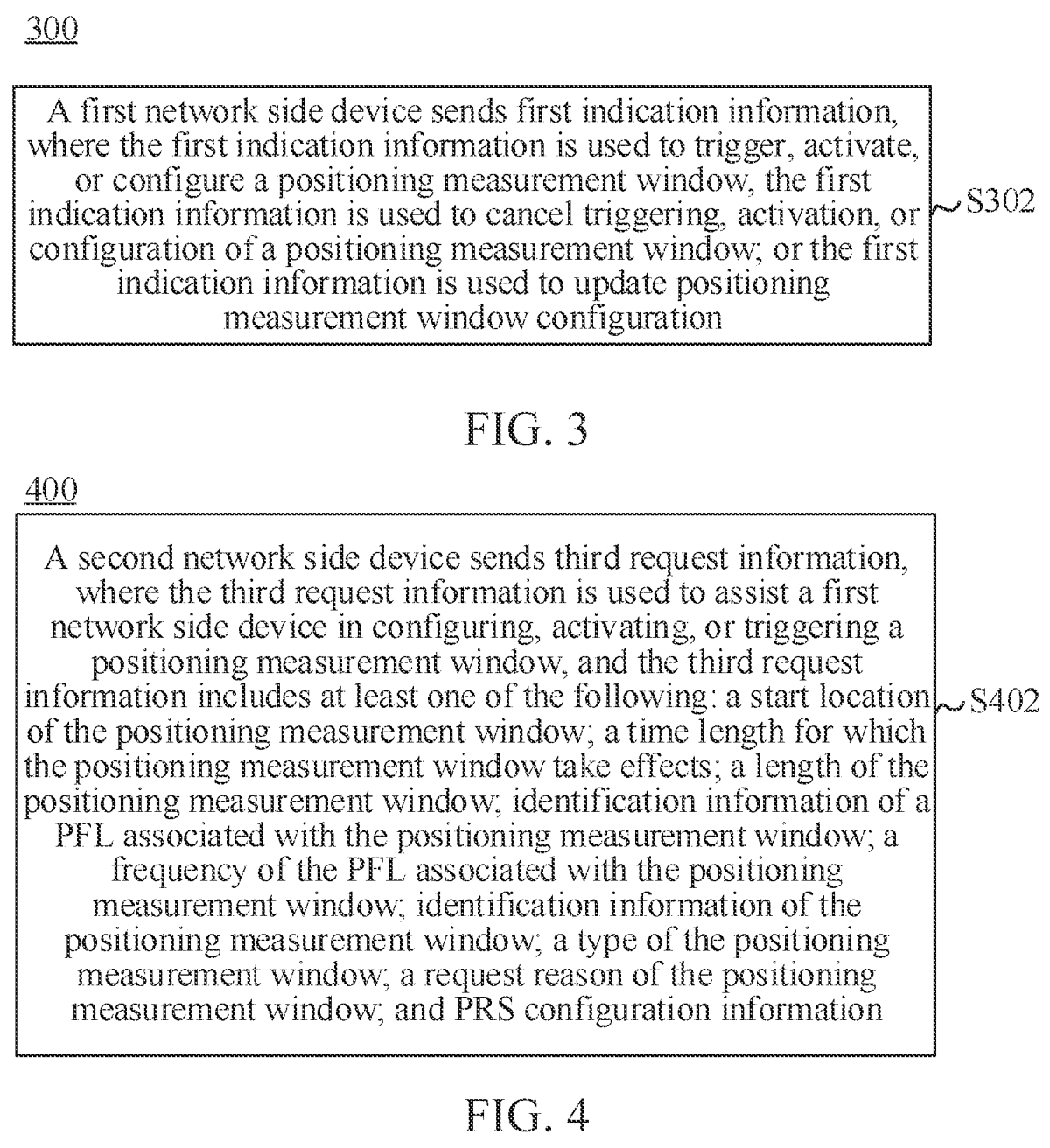

A first network side device sends first indication information, where the first indication information is used to trigger, activate, or configure a positioning measurement window, the first indication information is used to cancel triggering, activation, or configuration of a positioning measurement window; or the first indication information is used to update positioning measurement window configuration    ~S302

A second network side device sends third request information, where the third request information is used to assist a first network side device in configuring, activating, or triggering a positioning measurement window, and the third request information includes at least one of the following: a start location of the positioning measurement window; a time length for which the positioning measurement window take effects; a length of the positioning measurement window; identification information of a PFL associated with the positioning measurement window; a frequency of the PFL associated with the positioning measurement window; identification information of the positioning measurement window; a type of the positioning measurement window; a request reason of the positioning measurement window; and PRS configuration information    ~S402

FIG. 4

POSITIONING MEASUREMENT WINDOW INDICATION METHOD, TERMINAL, AND NETWORK SIDE DEVICE

CROSS-REFERENCE TO RELATED APPLICATIONS

This application is a continuation of International Application No. PCT/CN2021/137162, filed on Dec. 10, 2021, which claims priority to Chinese Patent Application No. 202011440363.9, filed on Dec. 10, 2020. The entire contents of each of the above-referenced applications are expressly incorporated herein by reference.

TECHNICAL FIELD

This application pertains to the field of communication technologies, and specifically, relates to a positioning measurement window indication method, a terminal, and a network side device.

BACKGROUND

A Positioning Reference Signal (PRS) is introduced into a New Radio (NR) system, and is used by a terminal to perform positioning measurement. To complete positioning, the terminal usually needs to measure PRSs sent by a plurality of cells.

Generally, in a case in which a currently activated downlink Bandwidth Part (BWP) matches the PRS (for example, a PRS bandwidth is within the currently activated downlink BWP and a PRS numerology is the same as the currently activated downlink BWP), the terminal may, measure the PRS in the currently activated downlink BWP without a positioning measurement window. The positioning measurement window includes, for example, a Measurement Gap (MG). In a case in which the currently activated downlink BWP does not match the PRS, the terminal needs to measure the PRS in the positioning measurement window.

In a case in which the currently activated downlink BWP does not match the PRS, the terminal cannot perform a positioning behavior (for example, measuring the PRS) in the positioning measurement window.

SUMMARY

Embodiments of this application provide a positioning measurement window indication method, a terminal, and a network side device.

According to a first aspect, a positioning measurement window indication method is provided. The method includes: A terminal receives first indication information, where the first indication information is used to trigger, activate, or configure a positioning measurement window, the first indication information is used to cancel triggering, activation, or configuration of a positioning measurement window, or the first indication information is used to update positioning measurement window configuration; and performing a positioning behavior based on the first indication information.

According to a second aspect, a positioning measurement window indication method is provided. The method includes: A first network side device sends first indication information, where the first indication information is used to tugger, activate, or configure a positioning measurement window, the first indication information is used to cancel triggering, activation, or configuration of a positioning measurement window; or the first indication information is used to update positioning measurement window configuration.

According to a third aspect, a positioning measurement window indication method is provided. The method includes: A second network side device sends third request information, where the third request information is used to assist a first network side device in configuring, activating, or triggering a positioning measurement window. The third request information includes at least one of the following: a start location of the positioning measurement window; a time length for which the positioning measurement window takes effect; a length of the positioning measurement window; identification information of a Positioning Frequency Layer (PFL) associated with the positioning measurement window; a frequency of the PFL associated with the positioning measurement window; identification information of the positioning measurement window; a type of the positioning measurement window; a request reason of the positioning measurement window; and PRS configuration information.

According to a fourth aspect, a positioning measurement window indication apparatus is provided. The apparatus includes: a receiving module, configured to receive first indication information, where the first indication information is used to trigger, activate, or configure a positioning measurement window, the first indication information is used to cancel triggering, activation, or configuration of a positioning measurement window, or the first indication information is used to update positioning measurement window configuration; and a positioning module, configured to perform a positioning behavior based on the first indication information.

According to a fifth aspect, a positioning measurement window indication apparatus is provided. The apparatus includes: a sending module, configured to send first indication information, where the first indication information is used to trigger, activate, or configure a positioning measurement window, the first indication information is used to cancel triggering, activation, or configuration of a positioning measurement window; or the first indication information is used to update positioning measurement window configuration.

According to a sixth aspect, a positioning measurement window indication apparatus is provided. The apparatus includes: a sending module, configured to send third request information, where the third request information is used to assist a first network side device in configuring, activating, or triggering a positioning measurement window. The third request information includes at least one of the following: a start location of the positioning measurement window; a time length for which the positioning measurement window takes effect; a length of the positioning measurement window; identification information of a PFL associated with the positioning measurement window; a frequency of the PFL associated with the positioning measurement window; identification information of the positioning measurement window; a type of the positioning measurement window; a request reason of the positioning measurement window; and PRS configuration information.

According to a seventh aspect, a terminal is provided. The terminal includes a processor, a memory, and a program or instructions that is/are stored in the memory and may be run on the processor. When the program or the instructions is/are executed by the processor, the method according to the first aspect is implemented.

According to an eighth aspect, a network side device is provided. The network side device includes a processor, a memory, and a program or instructions that is/are stored in the memory and may be run on the processor. When the program or the instructions is/are executed by the processor, the method according to the second aspect is implemented, or the method according to the third aspect is implemented.

According to a ninth aspect, a readable storage medium is provided. The readable storage medium stores a program or instructions. When the program or the instructions is/are executed by a processor, the method according to the first aspect is implemented, the method according to the second aspect is implemented, or the method according to the third aspect is implemented.

According to a tenth aspect, a computer program product is provided. The computer program product includes a processor, a memory, and a program or instructions that is/are stored in the memory and may be run on the processor. When the program or the instructions is/are executed by the processor, the method according to the first aspect is implemented, the method according to the second aspect is implemented, or the method according to the third aspect is implemented.

According to an eleventh aspect, a chip is provided. The chip includes a processor and a communication interface. The communication interface is coupled to the processor, and the processor is configured to run a program or instructions, so that the method according to the first aspect is implemented, the method according to the second aspect is implemented, or the method according to the third aspect is implemented.

In embodiments of this application, the terminal receives the first indication information, where the first indication information may be used to trigger, activate, or configure the positioning measurement window, to quickly trigger, activate, or configure the positioning measurement window, so that the terminal may quickly perform positioning measurement in the positioning measurement window. In some alternative embodiments, the first indication information may be used to cancel triggering, activation, or configuration of the positioning measurement window, to quickly cancel a previous positioning measurement window. In some alternative embodiments, the first indication information may be used to update positioning measurement window configuration, to quickly update the positioning measurement window configuration, so that the positioning measurement window configuration matches PRS configuration, and a PRS measurement effect is improved.

BRIEF DESCRIPTION OF DRAWINGS

FIG. 1 is a schematic diagram of a wireless communication system according to an embodiment of this application;

FIG. 2 is a schematic flowchart of a positioning measurement window indication method according to an embodiment of this application;

FIG. 3 is a schematic flowchart 1 of a positioning measurement window indication method according to an embodiment of this application;

FIG. 4 is a schematic flowchart 2 of a positioning measurement window indication method according to an embodiment of this application;

DETAILED DESCRIPTION

Figure 5:
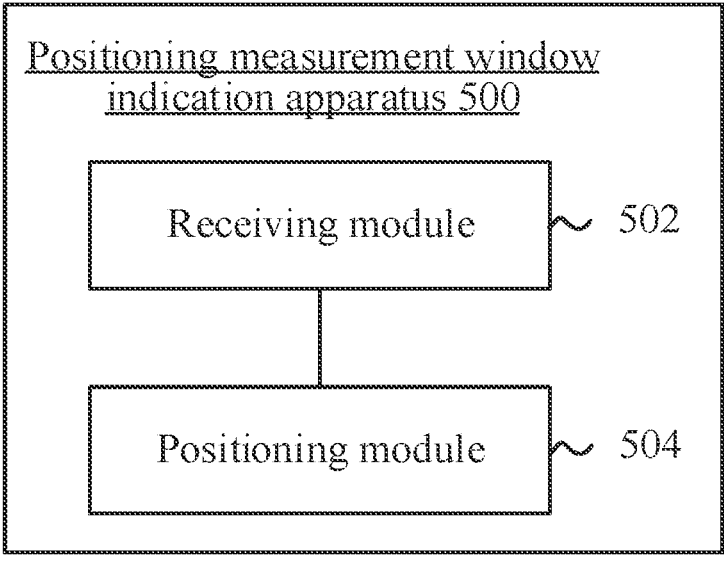
FIG. 5 is a schematic diagram of a structure of a positioning measurement window indication apparatus according to an embodiment of this application.

Technical solutions in embodiments of this application will be clearly described with reference to accompanying drawings in embodiments of this application. Apparently, the described embodiments are merely some rather than all of embodiments of this application. All other embodiments obtained by a person of ordinary skill in the art based on embodiments of this application shah fall within the protection scope of this application.

The terms "first", "second", and the like in the specification and claims of this application are intended to distinguish between similar objects, but are not intended to describe a specific sequence or order. It should be understood that data used in this way may be interchangeable in an appropriate situation, so that embodiments of this application can be implemented in a sequence other than those shown or described herein. In addition, objects distinguished by the "first" and the "second" are usually of one type. A quantity of objects is not limited. For example, a first object may be one, or may be multiple. In addition, in the specification and claims, "and/or" represents at least one of connected objects, and the character "/" usually indicates an "or" relationship between the associated objects.

It should be noted that a technology described in embodiments of this application is not limited to a LTE-Advanced (LTE-A) system of Long Term Evolution (LTE)/LTE, and may be further applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in embodiments of this application are often used interchangeably. The described technology may be used in the foregoing systems and radio technology, or may be used in another system and radio technology. For a purpose of an example, the following describes an NR system, and NR terms are used in most of the following descriptions. However, the technologies may be applied to an application other than an NR system application, such as a $6^{th}$ Generation (6G) communication system.

FIG. 1 is a schematic diagram of a wireless communication system to which an embodiment of this application is applicable. The wireless communication system includes a terminal 11 and a network side device 12. The terminal 11 may also be referred to as a terminal device or a User Equipment (UE). The terminal 11 may be a terminal side device such as a mobile phone, a tablet computer, a laptop computer or a notebook computer, a Personal Digital Assistant (PDA), a palmtop computer, a netbook, a Ultra-Mobile Personal Computer (UMPC), a Mobile Internet Apparatus, (MIA), a wearable device (Wearable Device), a Vehicle User Equipment (VUE), or a Pedestrian Terminal (PT). The wearable device includes a band, a headset, glasses, or the like. It should be noted that a specific type of the terminal 11 is not limited in this embodiment of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a next generation NodeB (gNB), a home NodeB, a home evolved NodeB, a WEAN access point, a Wi-Fi node, a Transmission and Reception Point (TRP), or another suitable term in the field, provided that a same technical effect is achieved. The base station is not limited to a specific technical vocabulary. It should be noted that, in this embodiment of this application, only a base station in the NR system is used as an example, but a specific type of the base station is not limited. A core network device may be a location server, including a location server (ESMLC) of LTE, a location server (e.g., Location Management Function (LMF)) of NR, or a location server in a subsequent version.

With reference to the accompanying drawings, the following describes in detail a positioning measurement window indication method, the terminal, and the network side device that are provided in embodiments of this application by using specific embodiments and application scenarios thereof.

As shown in FIG. 2, an embodiment of this application provides a positioning measurement window indication method 200. The method may be performed by a terminal. In other words, the method may be performed by software or hardware installed in a terminal. The method includes the following steps.

S202: The terminal receives first indication information, where the first indication information is used to trigger, activate, or configure a positioning measurement window, the first indication information is used to cancel triggering, activation, or configuration of a positioning measurement window, or the first indication information is used to update positioning measurement window configuration.

In this embodiment, the first indication information may be sent by a network side device, and the network side device may be a serving base station, such as a gNB, or may be a location server, such as an LMF entity.

The positioning measurement window mentioned in embodiments of this application may be an MG, or may be another time window used for positioning measurement. The following embodiments use the MG as an example, but is not limited to the MG.

For example, the positioning measurement window in this embodiment of this application may also be represented as a Radio Resource Management (RRM) measurement window or another measurement window, and a positioning behavior performed by the terminal based on the first indication information may also be represented as an RRM measurement behavior or another measurement behavior. In some embodiments, the RRM measurement window may be an SSB Measurement Timing Configuration (SMTC), SMTCs or an MG.

In an example, the positioning measurement window is an MG, and the MG may be one of an aperiodic MG, a semi-persistent MG, and a periodic MG. A PRS that subsequently performs PRS measurement may be one of a periodic PRS, an aperiodic PRS, and a semi-persistent PRS. In some embodiments, in a case in which the positioning measurement window is an MG, subsequent PRS measurement may also be RRM measurement, for example, SSB measurement or CSI-RS measurement. These signals may be periodic, aperiodic, or semi-persistent signals.

In some embodiments, the first indication information may be carried in Radio Resource Control (RRC) signaling, may be carried in Media Access Control-Control Element (MAC CE) signaling, may be carried in Downlink Control Information (DCI) signaling, or may be carried in LIE Positioning Protocol (LPP) signaling. In some embodiments, the first indication information may be carried in signaling for BWP switch, for example, signaling for DCI-based BWP switch.

For example, in a case in which the first indication information is used to trigger, activate, or configure the MG, the first indication information may be carried in the DCI signaling for the aperiodic MG; the first indication information may be carried in the MAC CE signaling for the semi-persistent MG; and the first indication information may be carried in the RRC signaling or the LPP signaling for the periodic MG. In some embodiments, the aperiodic MG may be represented as an MG triggered by DCI, the semi-persistent MG may be represented as an MG activated by an MAC CE, and the periodic MG may be represented as an MG configured by the RRC or LPP signaling.

S204: Perform a positioning behavior based on the first indication information.

In some embodiments, the step of performing a positioning behavior step based on the first indication information includes one of the following 1) to 3).

(1) In a case in which the first indication information indicates that the positioning measurement window is triggered, activated, or configured, PRS measurement in the positioning measurement window indicated by the first indication information. This embodiment facilitates quick triggering, activation, or configuration of the positioning measurement window, so that the terminal can quickly perform measurement in the positioning measurement window.

As described above, the MG may be one of an aperiodic MG, a semi-persistent MG and a periodic MG; and the PRS may be one of a periodic PRS, an aperiodic PRS, and a semi-persistent PRS. Generally, the terminal may perform periodic PRS measurement in the periodic MG, perform semi-persistent PRS measurement in the semi-persistent MG, and perform aperiodic PRS measurement in the aperiodic MG. It may be understood that this embodiment of this application is not limited thereto. For example, in the aperiodic MG, the terminal may measure a specific or some instances of the periodic PRS (PRS instance, PRS occasion, or PRS sample).

The aperiodic MG may be triggered by the DCI (where the DCI may carry the first indication information) signaling. The DCI signaling includes a small quantity of trigger information. With reference to preconfigured information and the like, the terminal obtains all information about the aperiodic MG, and measures the PRS in the aperiodic MG.

In some embodiments, corresponding MG preconfiguration information includes at least one of the following.

A trigger identifier. In some embodiments, the trigger identifier may indicate a trigger status identifier, one MG associates one trigger identifier, and in a case in which trigger signaling includes the identifier, a corresponding MG is triggered.

A trigger offset or a relative offset of an MG start location, in other words, an offset between the trigger signaling and an MG start moment.

MG identification information.

An MG type.

A serving cell indication associated with MG timing information.

An MG occasion length or an MG length.

A quantity of MG occasions.

A gap between the MG occasions.

MG Timing Advance (TA).

MG usage. For example, the MG is used for positioning measurement.

In some embodiments, the MG trigger signaling (for example, the first indication information carried in the DCI) includes at least one of the following.

A trigger identifier, where a corresponding MG is triggered.

MG identification information, where a corresponding MG in the MG identification information is triggered.

A trigger offset or a relative offset of an MG start location. For example, one of a plurality of preconfigured offset values is selected for an indication.

An MG occasion length indication. For example, one of a plurality of preconfigured MG occasion lengths is selected for an indication.

An MG occasion quantity indication. For example, one of a plurality of preconfigured MG occasion quantities is selected for an indication.

An MG occasion TA indication. For example, one of a plurality of preconfigured MG occasion TAs is selected for an indication. In some embodiments, the MG preconfiguration information may include configurations of a plurality of groups of parameter combinations, namely, a plurality of groups of MG configurations. In some embodiments, each group of MG configurations corresponds to one MG configuration ID. A group of MG configurations may be indicated in the trigger signaling.

In some embodiments, the aperiodic MG may be activated by the MAC CE (where the MAC CE may carry the first indication information), and the terminal measures the PRS in the aperiodic MG by preconfiguring or indicating at least one of an offset or an MG length. The aperiodic MG may take effect immediately after 3 ms after a slot (slot) in which the terminal sends an HARQ-ACK, of the MAC CE signaling, or may take effect after a specific offset after 3 ms.

In some embodiments, the semi-persistent MG may be activated by the MAC CE (where the MAC CE may carry the first indication information) signaling. With reference to MAC CE activation signaling, the semi-persistent MG takes effect by preconfiguring an MG period, an MG length, an MG period offset, MG TA, after the MAC CE signaling is activated (after 3 ms after the slot in which the terminal sends the HARQ-ACK of the MAC CE signaling).

In some embodiments, the semi-persistent MG may be triggered by the DCI signaling. The terminal measures the PRS in the semi-persistent MG by configuring/indicating an offset (an interval between a first MG occasion and the DCI), a quantity of MG occasions, an interval between adjacent MG occasions, an MG length, and the like. The semi-persistent MG may also be understood as a special aperiodic MG.

In some embodiments, corresponding MG preconfiguration information includes at least one of the following.

A relative offset of an MG start location, in other words, an offset a the MG relative to an MG period start location, or an offset between an MG start moment and activation signaling. The offset from the activation signaling includes one of an offset from a moment of receiving the activation signaling, an offset from a moment for feeding back an HARQ after the activation signaling is received, or an offset from a 3 ms moment after the activation signaling is received and the HARQ is fed back.

An MG period.

MG identification information.

An MG type.

A serving cell indication associated with MG timing.

An MG occasion length or an MG length.

A quantity of MG occasions.

A gap between the MG occasions.

MG TA.

MG usage. For example, the MG is used for positioning measurement.

In some embodiments, MG activation signaling (for example, the first indication information carried in the MAC CE signaling) includes at least one of the following.

MG identification information, where a corresponding MG in the MG identification information is activated.

A relative offset of an MG start location. For example, one of a plurality of preconfigured offset values is selected for an indication car the relative offset of the MG start location is directly indicated.

An MG occasion length indication. For example, one of a plurality of preconfigured MG occasion lengths is selected for an indication or the relative offset of the MG start location is directly indicated.

An MG occasion quantity indication. For example, one of a plurality of preconfigured MG occasion quantities is selected for an indication or the relative offset of the MG start location is directly indicated.

An MG occasion TA indication. For example, one piece of a plurality of preconfigured MG occasion TA is selected for an indication or the relative offset of the MG start location is directly indicated.

MG effective time, which indicates a time span generated when the MG takes effect. The MG fails after the time span.

In some embodiments, the MG preconfiguration information may include configurations of a plurality of groups of parameter combinations, namely, a plurality of groups of MG configurations. In some embodiments, each group of MG configurations corresponds to one MG configuration ID. A group of MCI configurations may be indicated in the activation signaling.

In some embodiments, MG deactivation signaling (corresponding to the activation signaling) includes at least one of the following.

MG identification information, where a corresponding MG in the MG identification information is deactivated.

A deactivation identifier, which indicates that the signaling is used to deactivate the MG.

In some embodiments, the preconfiguration information of the semi-persistent MG herein is also applicable to configuration of the periodic MG. When a network configures the periodic MG, configuration information may include the foregoing preconfiguration information.

(2) In a case in which the first indication information indicates that triggering, activation, or configuration of the positioning measurement window is cancelled, cancel performing PRS measurement by using a target positioning measurement window, where the target positioning measurement window is indicated or (pre) configured by a network side device before the first indication information is received. This embodiment includes: cancelling performing PRS measurement by using previously configured, preconfigured, activated, and triggered target positioning measurement windows. In other words, use of previous positioning measurement windows is cancelled to perform PRS measurement, and therefore the positioning measurement window can be quickly cancelled.

(3) In a case in which the first indication information indicates that the positioning measurement window configuration is updated, perform PRS measurement in an updated positioning measurement window indicated by the first indication information. This embodiment may quickly update the positioning measurement window configuration by using the first indication information, so that the positioning measurement window configuration matches PRS configuration, and a PRS measurement effect is improved.

In the positioning measurement window indication method provided in embodiments of this application, the terminal receives the first indication information, where the first indication information may be used to trigger, activate, or configure the positioning measurement window, to quickly trigger, activate, or configure the positioning measurement window, so that the terminal may quickly perform positioning measurement in the positioning measurement window. In some alternative embodiments, the first indication information may be used to cancel triggering, activation, or configuration of the positioning measurement window, to quickly cancel a previous positioning measurement window. In some alternative embodiments, the first indication information may be used to update the positioning measurement window configuration, to quickly, update the positioning measurement window configuration, so that the positioning measurement window configuration matches PRS configuration, and a PRS measurement effect is improved.

Generally, PRS configuration is directly sent to the terminal by a location server by using LPP signaling. A serving gNB does not know specific configuration information of the PRS sent by an adjacent cell, where the specific configuration information includes a time domain location and frequency domain location of the PRS sent by the adjacent cell. Therefore, after accurately obtaining a PRS location (such as the time domain location), the terminal may request an appropriate positioning measurement window configuration (such as MG configuration) from the serving gNB based on the PRS location.

For the aperiodic PRS, the terminal can obtain the time domain location of the PRS only after receiving DCI signaling carrying triggered or activated the aperiodic PRS. However, if the terminal requests a positioning measurement window (such as an MG) after receiving the DCI signaling, and then receives positioning measurement window configuration or trigger signaling, the terminal cannot measure the aperiodic PRS in the positioning measurement window in time. Therefore, how to activate/configure/trigger the positioning measurement window in time by enabling the serving gNB to obtain an approximate location of the positioning measurement window before DCI signaling for the PRS is triggered is an issue to be further addressed.

In some embodiments, before the terminal receives the first indication information in the embodiment 200, the method further includes: the terminal sends first request information, where the first request information is used to assist a network side device (such as a serving gNB) in configuring, activating, or triggering a positioning measurement window. The first indication information mentioned in this embodiment is used to trigger, activate, or configure the positioning measurement window. Further, the terminal may send the first request information before receiving a PRS or receiving trigger signaling of the PRS.

This embodiment facilitates the serving gNB to obtain the approximate location of the positioning measurement window, to quickly trigger, activate, or configure the positioning measurement window, so that the terminal can quickly perform positioning measurement in the positioning measurement window.

In some embodiments, the first request information may be one of the following: Uplink Control Information (IO), MAC CE signaling, RRC signaling, LPP signaling, and the like.

In some embodiments, the first request information may include at least one of the following.

(1) A request flag of the positioning measurement window. That is, the request flag is used to indicate to the network side device that the terminal needs to perform PRS measurement in the positioning measurement window, or that the terminal needs to perform measurement of an PFL in the positioning measurement window.

(2) A type of the positioning measurement window in some embodiments, the positioning measurement window may be an MG, and a type of the MG is one of a periodic MG, a semi-persistent MG, and an aperiodic MG. In some embodiments, the type of the MG includes an MG that simultaneously measure a plurality of frequency layers or a group of MGs that simultaneously perform measurement.

(3) A serving cell indication associated with timing information of the requested positioning measurement window. The serving cell indication, with reference to an offset and a period of the positioning measurement window requested by the terminal, may assist the network side device in determining time at which the terminal expects to need the positioning measurement window.

In some embodiments, the serving cell may be a primary cell (pcell), a primary and secondary cell (pscell), or a serving cell identifier in another Master Cell Group (MCG) or Secondary Cell Group (SCG).

In some embodiments, a protocol stipulates that timing information of a specific serving cell (such as a pcell) is used as timing information of the requested location measurement window, or System Frame Numbers (SFNs) of all serving cells are synchronized, and the first request information sent by the terminal may not include the serving cell indication.

(4) Identification information of a PFL associated with the positioning measurement window. For example, identification information of the PFL associated with the MG may indicate that the MG is used for measurement of one or some PFLs. In some embodiments, the identification information of the PFL includes at least one of the following: an identifier of the PFL; and an identifier of a PFL group. The PFL group includes a plurality of PFLs that are transmitted (or aggregated) simultaneously. The terminal requests to configure a corresponding MG for the PFL, such as one MG is configured for one PFL group, or a plurality of simultaneous MGs are configured for a plurality of PFLs of one PFL group.

(5) A frequency associated with the positioning measurement window, that is, a frequency on which the terminal expects to perform measurements in the positioning measurement window. For example, the frequency is a frequency of the PFL associated with the MG, for example, a Downlink PRS reference Point (DL-PRS-PointA) or a frequency on which the terminal expects to perform measurements in the MG.

(6) Identification information of the positioning measurement window, for example, MG identification information. The MG identification information includes at least one of the following.

An MG identifier, such as an MG ID.

An MG group identifier, such as an MG group ID. In some embodiments, an MG group includes a plurality of MGs with similar characteristics, such as a plurality of simultaneous MGs.

An MG pattern identifier, that is, a set of a GAP period and length stipulated in a protocol.

An MG configuration identifier, such as a plurality of types of MG configurations are preconfigured. Each MG configuration is associated with one IIS. UE may request an ID of the configuration when requesting an MG configuration. Each MG configuration includes a group of MG configurations, including at least one of the following: an MG configuration identifier, an MG length, a period, an offset, a relative offset, timing advance, and the like.

(7) A relative offset of a start location of the positioning measurement window, which is described in detail below.

(8) Absolute time of the start location of the positioning measurement window.

The absolute time may not be based on timing of a cell, such as SFN initialization time. For the SFN initialization time, in some embodiments, the time may be represented by 64-bit. The time is relative to 0 o'clock time on Jan. 1, 1900, a unit is seconds, an integer part is represented by first 32-bit, and a fractional part is represented by last 32-bit (a granularity is $\frac{1}{2}^{32}$ seconds). In other words, the SFN initialization time is absolute time.

(9) A quantity of positioning measurement window occasions (or referred to as positioning measurement window occasions), for example, a quantity of MG occasions. One MG occasion may be understood as an MG instance, an MG sample, representing an MG of one period (if the MG is a periodic MG) or representing an MG window whose length is equal to an MG length. In a case in which there are a plurality of positioning measurement window occasions, the start location of the positioning measurement window is a start location of a first positioning measurement window occasion in the plurality of positioning measurement window occasions.

(10) A gap between the positioning measurement window occasions. In some embodiments, in the plurality of positioning measurement window occasions, gaps between adjacent positioning measurement window occasions are the same.

(11) PRS configuration information, for example, PRS time domain and/or frequency domain information. The PRS time domain information includes but is not limited to: a PRS period, a PRS period offset, a PRS start location (absolute time or relative time), and consecutive PRS duration. The PRS frequency domain information includes but is not limited to configuration information of one or more positioning frequency layers, including but not limited to: a PRS bandwidth, a reference point (e.g., DL PRS pointA), a start PRB location, and a numerology.

(12) BWP configuration information. The bandwidth part configuration information includes at least some BWP configuration information, including but not limited to: frequency domain location information of a carrier on which a BWP is located (including a pointA, a start PRB, a numerology, a bandwidth, and the like of the carrier), and frequency domain location information of the BWP (including a start PRB, a numerology, a bandwidth, and the like of the MVP). In some embodiments, the bandwidth part configuration information includes active IMP configuration and inactive BWP configuration, including BWP configuration information of all serving cells.

In some embodiments, the first request information may include request information of at least one positioning measurement window. That is, the first request information is used to assist the network side device in configuring, activating, or triggering the at least one positioning measurement window.

In some embodiments, if the positioning measurement window is an MG, the terminal may explicitly indicate a location of a PRS window (absolute time or relative time) to the serving gNB without explicitly indicating a desired MG location of the terminal when requesting the MG. In this way, the serving gNB determines an appropriate MG location based on an actual PRS location, and further indicates the MG location to the terminal. In some embodiments, for 6) the identification information of the positioning measurement window including the MG configuration identifier and 4) the identification information of the PH, associated with the positioning measurement window in the foregoing embodiment, these information may be obtained from a last (or previous) positioning measurement window configuration or request, configuration of a preconfigured positioning measurement window, or positioning measurement window configuration stipulated in the protocol.

In some embodiments, the relative offset of the start location of the positioning measurement window mentioned in the foregoing 7) includes at least one of the following.

(a) An offset of the start location of the positioning measurement window relative to a start location of a PRS sent by the serving cell, in some embodiments, the start location of the PRS is a start location of a PRS resource set.

(b) An offset of the start location of the positioning measurement window relative to a start location of a PRS window. The PRS window may be indicated to the serving gNB in advance by the location server, and the PRS window includes PRSs sent by a plurality of cells/base stations/TRPs that participate in positioning.

(c) An offset of the start location of the positioning measurement window relative to received. DCI used to trigger a PRS. In some embodiments, the PRS may be the PRS sent by the serving cell, or the PRS window.

(d) An offset of the start location of the positioning measurement window relative to a pre-configured location associated with the PRS. The preconfigured location is known to both the serving gNB and the terminal.

(e) An offset of the start location of the positioning measurement window relative to a system frame number 0 of the serving cell.

In this embodiment, the starting location of the positioning measurement window may be understood as a location of a first subframe or slot of the positioning measurement window or a location of an initial subframe or slot of a first MG occasion in a plurality of positioning measurement window occasions (such as MG occasions). For example, for an aperiodic MG, an MG start location is a location of an initial subframe or slot of an MG window. For a semi-persistent MG, an MG start location is a location of an initial subframe or slot of a first MG occasion in a plurality of MG occasions.

In this embodiment, the start location of the positioning measurement window may be replaced by a stop location of the positioning measurement window or an end location of the positioning measurement window. A location of the positioning measurement window may be obtained provided that a start or end location and a length of the positioning measurement window are obtained.

In some embodiments, sending of the first request information mentioned in the foregoing embodiments includes: sending the first request information in a case in which a first timer runs or expires. A start moment of the first timer includes one of the following.

(1) A moment for determining that PRS configuration (or PRS preconfiguration) information is obtained, for example, a moment at which the terminal sends feedback information (e.g., HARQ-ACK) of the PRS configuration information. The PRS configuration herein may also be represented as positioning assistance information or preconfigured positioning assistance information.

(2) A moment for receiving the PRS configuration information.

(3) A moment for completing parsing of the PRS configuration information.

(4) A moment for determining positioning information request signaling. For example, the first timer is started when confirmation information (such as an HARQ-ARK) requested by positioning information is fed back. The positioning information request signaling may be one of RRC signaling, MAC CE signaling, DCI signaling, and LPP signaling.

(5) A moment for receiving the positioning information request signaling, for example, a moment at which the terminal receives the positioning information request signaling triggered by the DCI.

(6) A moment at which a positioning information request or the PRS configuration takes effect. For example, in a case in which signaling carrying the foregoing information is the MAC CE, an effective moment is 3 ms after the terminal sends HARQ feedback.

It may be understood that the start moment of the first timer may be a moment after any of the foregoing listed 1) to 6) moments plus preset duration. This embodiment of this application is not limited thereto.

Duration of the first timer may be indicated by the network side device or stipulated in the protocol.

In an example, the duration of the first timer is related to the PRS configuration information, for example, the duration of the first timer is related to a PRS (pre) configuration period such as a multiple relationship or interception relationship of (pre) configuration (that is, partial duration is intercepted as the duration of the first timer). For another example, the duration of the first timer is related to a response time requirement of location information (such as response time carried in a positioning request), for example, partial response time requirements are intercepted as the duration of the first timer. For another example, the duration of the first timer is related to a minimum or maximum value between the foregoing PRS configuration information and the foregoing response time requirement of the location information, for example, the minimum or maximum value of the foregoing two is selected.

In another example, the duration of the first timer is duration indicated by the network side device or stipulated in the protocol, such as response time indicated by a network or stipulated in the protocol.

The foregoing embodiment describes in detail a case of sending the first request information. In another case, the terminal may further send second request information before receiving the first indication information. The second request information includes a positioning measurement window stop message or a positioning measurement window enabling message. The positioning measurement window stop message is used to assist the network side device in stopping or cancelling a positioning measurement window. The positioning measurement window enabling message is used to assist the network side device in enabling a (new) positioning measurement window. In this embodiment, for example, the terminal may send the second request information before receiving a PRS or receiving trigger signaling of the PRS.

In some embodiments, the second request information may be one of the following: UCI), MAC CE signaling, RRC signaling, LPP signaling, and the like.

Generally, in a case in which a currently active Downlink (DL) BWP matches the PRS, for example, a PRS bandwidth is within the active DL BWP and a PRS numerology is the same as the active DL BWP, the terminal may measure the PRS in the active DL BWP but not in a positioning measurement window.

In a case in which an active DL BWP does not match the PRS, the terminal needs to measure the PRS in a positioning measurement window. After the PRS and the positioning measurement window are configured, if BWP switch occurs before the PRS is measured, it is likely that a switched BWP exactly matches the PRS. Because the serving gNB does not know a frequency domain location of the PRS, and the serving gNB still configures/triggers the positioning measurement window to enable the terminal to measure the PRS in the positioning measurement window, this results in invalid positioning measurement window configuration and unnecessary data interruption. This is because the terminal needs to interrupt transmission of data/control signaling in the positioning measurement window and may measure only a corresponding signal such as a signal PRS used for positioning.

For example, in a case in which an aperiodic PRS is measured in an aperiodic MG, if BWP switch occurs before the positioning measurement window and trigger signaling of the PRS are received, the BWP matches the PRS. If the serving gNB still triggers an aperiodic positioning measurement window, resources are wasted. Therefore, when BWP switch occurs, the terminal needs to determine whether to stop or enable the positioning measurement window. If necessary, the terminal sends the second request information to the serving gNB, to indicate that a status of the positioning measurement window needs to be changed. Further, after BWP switch is completed, the gNB may quickly indicate, to the terminal, that a status of a specific positioning measurement window is changed (which is implemented by using the first indication information). Similarly, the foregoing BWP switch scenario is applicable to a scell activation and deactivation scenario.

In some embodiments, the positioning measurement window stop or cancel message mentioned above includes at least one of the following.

(1) A stop or cancel reason. In some embodiments, the reason includes one of the following: BWP switch. The BWP switch enables the terminal to perform PRS measurement in a switched BWP. In some embodiments, the reason further includes a type of BWP switch, such as DCI-based BWP switch, time-based BWP switch, or secondary cell activation. The secondary cell activation enables the LIE to perform PRS measurement in an activated secondary cell.

(2) Identification information, for example, identification information of a stopped MG.

(3) Identification information of an associated PFL, for example, identification information of the positioning frequency layer associated with the stopped MG. In other words, the MG associated with the frequency layer is stopped.

(4) An associated frequency, for example, a frequency associated with the stopped MG, such as an ARFCN associated with the MG or a DL-PRS-pointA of the frequency layer associated with the MG.

(5) A configuration identifier, for example, a configuration ID of the stopped MG.

(6) Stop time or cancel time, for example, a stopped or cancelled MG for a period of time. The period of time includes start time and/or a time span of the period of time, (7) A BWP identifier, for example, a BWP ID, which may be an ID before BWP switch is performed and/or an II) after BWP switch is performed. Further, the BWP identifier further includes a serving cell ID of a serving cell in which a BWP is located.

(8) The serving cell identifier, for example, a serving cell ID corresponding to an activated scell.

(9) Configuration information of a stopped or cancelled positioning measurement window. For example, in a case in which the positioning measurement window is an MG, the configuration information at least includes information such as an MG period, an MG period offset, an MG length, or MG TA. The configuration information is used by a network side device to identify an MG the terminal expects to cancel.

In some embodiments, when the terminal sends the second request information to request to stop or cancel a plurality of positioning measurement windows, a plurality of groups of positioning measurement window stop messages are carried in the second request information. In some alternative embodiments, if a plurality of positioning measurement windows requested for stop or cancellation are associated with a common ID, the second request information may include the common ID, to indicate the gNB to stop or cancel the plurality of positioning measurement windows. In some embodiments, the common ID may be a trigger ID associated with the positioning measurement window, a trigger state II), a positioning measurement window group ID, or another common ID.

In some embodiments, the positioning measurement window enabling message mentioned above includes at least one of the following.

(1) An enabling reason. In some embodiments, the reason includes one of the following: MVP switch. That is, the BWP switch enables the terminal not to perform PRS measurement in a switched BWP In some embodiments, the reason further includes a type of BWP switch, such as DCI-based BWP switch, time-based BWP switch, or secondary cell deactivation. That is, the secondary cell deactivation enables a PRS not to be measured.

(2) identification information, for example, identification information of an enabled MG.

(3) Identification information of an associated PFL, for example, identification information of the positioning frequency layer associated with the enabled MG.

(4) An associated frequency, for example, a frequency associated with the enabled MG, such as an ARFCN associated with the MG or a DL-PRS-pointA of the frequency layer associated with the MG.

(5) A configuration identifier, for example, a configuration ID of the enabled MG.

(6) Enabling time.

(7) A BWP identifier, for example, a BWP ID, which may be an ID before BWP switch is performed and/or an ID after BWP switch is performed. Further, the BWP identifier includes a serving cell ID of a serving cell in which a BWP is located.

(8) The serving cell identifier, for example, a scell ID, which may be a serving cell ID corresponding to a deactivated scell.

In some embodiments, the positioning measurement window enabling message carried by the second request information may be an update indication of positioning measurement window configuration, such as an update indication of MG configuration, so that the network side device can send the first indication information in time. The first indication information is used to indicate update of the positioning measurement window configuration.

In some embodiments, when the terminal sends the second request information to request to enable a plurality of positioning measurement windows, a plurality of groups of positioning measurement window enabling messages are carried in the second request information. In some alternative embodiments, if a plurality of positioning measurement windows requested for enabling are associated with a common ID, the second request information may include the common ID, to indicate the gNB to enable the plurality of positioning measurement windows. In some embodiments, the common ID may be a trigger ID associated with the positioning measurement window, a trigger state ID, a positioning measurement window group ID, or another common ID.

In some embodiments, sending of the second request information mentioned above in the plurality of embodiments includes: sending the second request information in a case in which a second timer runs or expires. A start moment of the first timer is related to one of the following.

(1) A moment for receiving a command for IMP switch.

(2) A moment for determining that BWP switch information is obtained, for example, a moment after the terminal receives DO signaling for the IMP switch or a moment when confirmation information of signaling for the BWP switch is fed back.

(3) A moment for completing the BWP switch.

(4) A moment for receiving a command for secondary cell activation or deactivation.

(5) A moment for determining that secondary cell activation or deactivation information is obtained. For example, the second timer is started when confirmation information (such as an HARQ-ARK) of the scell activation/deactivation is fed back or when a moment at which confirmation information (such as an HARQ-ARK) of the scell activation/deactivation is fed back plus 3 ms.

(6) A moment for completing the secondary cell activation or deactivation, for example, a CSI feedback moment of the scell.

It may be understood that the start moment of the second timer may be a moment after any of the foregoing listed 1) to 6) moments plus preset duration. This embodiment of this application is not limited thereto.

Duration of the second timer may be indicated by the network side device or stipulated in the protocol.

In an example, the duration of the second timer is related to the PRS configuration information, for example, the duration of the second timer is related to a PRS (pre) configuration period such as a multiple relationship or interception relationship of (pre) configuration (that is, partial duration is intercepted as the duration of the first timer).

For another example, the duration of the second timer is related to a response time requirement of location information (such as response time carried in a positioning request), for example, partial response time requirements are intercepted as the duration of the second timer. For another example, the duration of the first timer is related to a minimum or maximum value between the foregoing PRS configuration information and the foregoing response time requirement of the location information, for example, the minimum or maximum value of the foregoing two is selected.

In another example, the duration of the second timer is duration indicated by the network side device or stipulated in the protocol, such as response time indicated by a network or stipulated in the protocol.

In some embodiments, sending of the second request information mentioned above in the plurality of embodiments may further include: sending the second request information in a case in which at least one of the following events is met or the following events occur (where the events trigger the terminal to send a second request).

(1) BWP switch occurs. To be specific, the BWP switch enables the terminal to perform PRS measurement in a switched BWP, or the BWP switch enables the terminal not to perform PRS measurement in a switched IMP (2) Secondary cell activation or deactivation occurs. For example, the secondary cell activation enables the terminal to perform PRS measurement in an active IMP of an activated secondary cell, or the secondary cell deactivation enables a PRS not to be measured in an active BW P.

(3) The second timer is running or expires.

In some embodiments, the first indication information mentioned in the embodiment 200 is used to cancel triggering, activation, or configuration of the positioning measurement window. The first indication information includes at least one of the following of the positioning measurement window.

(1) A cancel flag.

(2) identification information, (3) identification information of an associated PFL.

(4) Frequency information of the associated PFL.

(5) A cancel reason.

(6) An associated common identifier. For example, in a case in which the first indication information is used to cancel a plurality of MGs, common identifiers associated with the plurality of MGs may be included in an indication. In some alternative embodiments, if a plurality of MGs are associated with a common ID, the common ID may be included, indicating cancellation of the plurality of MGs. In some embodiments, the ID may be a trigger ID associated with the MG, a trigger state ID, or an MG group ID.

(7) Stop time or cancel time, for example, a stopped or cancelled MG for a period of time. The period of time includes start time and/or a time span of the period of time.

(8) Configuration information of a cancelled positioning measurement window.

In some embodiments, the first indication information mentioned in the embodiment 200 is used to update positioning measurement window configuration. The first indication information includes at least one of the following.

(1) An update identifier of the positioning measurement window.

(2) Identification information of the positioning measurement window that needs to be updated.

(3) Identification information of a PFL associated with the positioning measurement window that needs to be updated.

(4) Frequency information of the PFL associated with the positioning measurement window that needs to be updated.

In some embodiments, the first indication information mentioned in the embodiment is used to update at least one of the following of the positioning measurement window configuration:

(1) a trigger offset, for example, a previously configured trigger offset is inappropriate, and a new trigger offset is updated;

(2) a period;

(3) a length;

(4) timing advance;

(5) a relative offset of a start location of the positioning measurement window;

(6) absolute time of the start location of the positioning measurement window;

(7) a quantity of positioning measurement window occasions; and (8) a gap between the positioning measurement window occasions.

In some embodiments, the first indication information is received at a moment outside the positioning measurement window. For example, the terminal does not expect to receive the first indication information in any positioning measurement window. For example, if the first indication information is used to cancel MG triggering, activation or configuration, or used to update MG configuration, the terminal does not expect to receive the first indication information in any MG time window.

In some embodiments, the first indication information includes cancellation of the positioning measurement window or update of the positioning measurement window, in other words, the first indication information is used to cancel triggering, activation, or configuration of the positioning measurement window. In some alternative embodiments, the first indication information is used to update positioning measurement window configuration. A receiving moment of the first indication information is not later than (or earlier than) a moment for receiving signaling of triggering or activating the positioning measurement window. In this embodiment, the terminal does not expect the receiving moment of the first indication information to be later than the moment for receiving the signaling of triggering or activating the positioning measurement window.

In some embodiments, a receiving moment of the first indication information is not later than (or earlier than) a start moment of the positioning measurement window; or a receiving moment of the first indication information is not later than (or earlier than) a moment that is before a start moment of the positioning measurement window and that reaches preset duration. In this embodiment, the terminal does not expect the receiving moment of the first indication information to be later than the start moment of the positioning measurement window; or the receiving moment of the first indication information is later than a moment that is before the start moment of the positioning measurement window and that reaches the preset duration. The preset duration may be stipulated in a protocol, indicated by a network side device, or determined by a UE capability. For example, the preset duration is a moment with a length of N from an MG start moment. In this embodiment, for example, the terminal does not expect a moment (or a moment at which an MG indication takes effect) for receiving an MG indication to be later than the MG start moment, or to be later than a moment before the MG start moment.

In some embodiments, the embodiment 200 further includes: in a case in which the terminal detects that one of the following events is met, the terminal determines that the positioning measurement window is stopped, cancelled, or discarded.

(1) An aperiodic CSI report overlaps with the positioning measurement window.
  (2) A first channel or signal overlaps with the positioning measurement window. The first channel may be a Physical Random Access Channel (PRACH) or a Physical Uplink Control Channel (PUCCH). The first signal may be a Sounding Reference Signal (SRS).
  (3) Ultra Reliable and Low Latency Communication (URLLC) service scheduling overlaps with the positioning measurement window.
  (4) ICI indicates that a flexible symbol in a slot format is uplink, and the flexible symbol overlaps with the positioning measurement window.
  (5) A second channel or a second signal that the DCI indicates the terminal to transmit overlaps with the positioning measurement window. The second channel may be a PUCCH, a PRACH, or a Physical Uplink Shared Channel (PUSCH). The second signal may be an SRS.

In fact, this embodiment may be implemented in a case in which the first indication information in the embodiment 200 is used to trigger, activate, or configure the positioning measurement window, or the first indication information is used to update the positioning measurement window configuration. Because the terminal has already obtained the positioning measurement window, if the terminal detects that one of the foregoing events is met, the terminal determines that the positioning measurement window is stopped, cancelled, or discarded, and then performs PRS measurement in the positioning measurement window.

It may be understood that the foregoing embodiment may be in parallel with the embodiment 200. To be specific, regardless of whether the terminal receives the first indication information, the terminal determines that the positioning measurement window is stopped, cancelled, or discarded in a case in which the terminal detects that one of the foregoing events is met.

In some embodiments, the first indication information in the embodiment 200 is used to trigger, activate, or configure the positioning measurement window. An aperiodic positioning measurement window and/or a semi-persistent positioning measurement window may be configured, activated, or triggered for the terminal only in a case in which PRS measurement is configured for the terminal. For example, an aperiodic MG and/or a semi-persistent MG may be configured/activated/triggered for the terminal only when PRS measurement is configured for the terminal.

In some embodiments, before the performing a positioning behavior based on the first indication information, the method further includes: receiving positioning measurement window configuration, where the positioning measurement window configuration includes a positioning measurement window offset, and a granularity of the positioning measurement window offset is less than 1 millisecond. In some embodiments, the offset is ⅟₃₂ ms, and a size is 0 to 31. If a value of the positioning measurement window offset is 1, ⅟₃₂ MS is represented; if a value of the positioning measurement window offset is 2, ²⁄₃₂ ms is represented, or the like. This embodiment implements more accurate control of the positioning measurement window offset.

In a related technology, only a periodic MG exists, and there is no semi-persistent or aperiodic MG. A granularity of the periodic MG offset is an ms level. In this embodiment, a granularity less than ms is added, such as a slot-level offset. In some embodiments, before using an MG to measure a PRS, the terminal receives MG configuration. The MG configuration includes MG length configuration or MG offset configuration of less than ms. In some embodiments, a granularity of the length or the offset is ⅟₃₂ ms, and a size is 0 to 31. If a value of the offset is 1, ⅟₃₂ ms is represented; or if a value is 2, ²⁄₃₂ ms is represented; or the like. In some embodiments, a specific field may be used to represent a granularity less than ms. In a case in which the field is configured, an MG granularity is less than ms; or In a case in which the field is not configured, an MG granularity is an integer multiple of ms.

In some embodiments, the first indication information is used to trigger, activate, or configure the positioning measurement window, and the terminal does not perform at least one of the following events after receiving the first indication information. In some alternative embodiments, at least one of the following events does not occur after the terminal receives the first indication information. In some alternative embodiments, the terminal does not expect at least one of the following events to occur after receiving the first indication information. An some alternative embodiments, the terminal does not receive signaling related to at least one of the following events after receiving the first indication information:

(1) BWP switch;
  (2) secondary cell activation; and
  (3) secondary cell deactivation.

In this embodiment, for example, the terminal does not expect at least one of the following events to occur after triggering DCI signaling for an MG and/or a PRS: BWP switch, scell activation, and scell deactivation. In some embodiments, the terminal does not expect at least one of the following events to occur after activating MAC CE signaling for an MG and/or a PRS: BWP switch, scell activation, and scell deactivation.

In some embodiments, the first indication information is used to trigger, activate, or configure the positioning measurement window. A receiving moment of the first indication information is not later than (or earlier than) a moment for receiving signaling of triggering or activating a PRS. In this embodiment, the terminal does not expect the receiving moment of the first indication information to be later than the moment for receiving signaling of triggering or activating the PRS. In this embodiment, for example, the terminal does not expect DCI that triggers the MG to be later than DCI received by triggering the PRS. In some embodiments, regardless of whether the two types of DCI are on a same carrier or different carriers, the terminal does not expect the DCI that triggers the MG to be later than the DCI received by triggering the PRS.

In some embodiments, the terminal does not expect a moment (or a moment at which an positioning measurement window indication takes effect) for receiving the positioning measurement window indication (such as the first indication information is used to cancel a positioning measurement window or update a positioning measurement window) to be later than a moment for receiving signaling of triggering, activating, or configuring the positioning measurement window (or a moment at which signaling of triggering, activating, or configuring the positioning measurement window takes effect). If the positioning measurement window is an MG, the terminal does not expect a moment (or a moment at which an MG indication takes effect) for receiving the MG indication (such as the first indication information is used to cancel the MG or update MG configuration) to be later than a moment for receiving signaling of triggering, activating, or configuring the MG (or a moment at which signaling of triggering, activating, or configuring the MG takes effect). In some embodiments, the terminal does not expect a moment of an MG cancel or update indication to be later than a moment of an MG trigger or activation indication. Otherwise, the terminal cannot cancel or update the MG in time. The moment may be a corresponding symbol, slot, subframe, or the like. For a DCI indication, the effective moment is a moment for receiving DCI. For an MAC Cl indication, the effective moment is a moment after 3 ms after an HARQ-ARK corresponding to an MAC CE is sent. For an RRC or LPP indication, the effective moment is a moment after a moment for sending the corresponding HARQ-ARK plus a latency (about 10 ms) for the terminal to process higher layer signaling.

In some embodiments, the foregoing behaviors performed by the terminal may be stipulated in the protocol, indicated by the network side device, or selected by the terminal.

In some embodiments, in the embodiment 200, the terminal may further send the first indication information to a second network side device. For example, the terminal sends MG configuration information to a location server, to assist the location server in performing a subsequent positioning resource indication or performing a subsequent positioning behavior. For example, when the location server learns that MG configuration does not meet an expectation, new MG configuration is requested from the gNB, or the like.

The following describes a method for calculating a start location of an aperiodic or semi-persistent positioning measurement window (e.g., MG) by using several embodiments.

Embodiment 1

The embodiment of this application shows that a gap start location of the aperiodic MG and a gap start location are related to at least one of a gap subframe start location and gap TA.

The gap subframe start location indicates an SFN in which a first subframe of the MG is located and a location of the subframe (the first subframe of the measurement gap occurs at an SFN and subframe), and is related to at least one of a slot or subframe in which DCI signaling is located, an aperiodic MG trigger offset, an SFN offset between a serving cell to which a PDCCH belongs and a serving cell associated with MG timing, the serving cell associated with the MG timing, and the like. The first or start subframe location of the MG meets the following formula:

$$\left\lfloor ng \frac{1}{2^{\mu_{PDCCH}}} \right\rfloor + X + K$$

Herein, n is a slot including DCI, and X is the aperiodic MG trigger offset (where a unit is subframe or ms, and the aperiodic MG trigger offset is a subframe offset between the DCI and an actual MG subframe start point).

In some embodiments, the offset may be preconfigured by a network or stipulated in a protocol. In some alternative embodiments, the DCI signaling indicates one offset after a plurality, of offsets are preconfigured by a network or stipulated in a protocol.

$\mu_{PDCCH}$ is subcarrier spacing configuration for the PDCCH.

K is an SFN offset between a serving cell SEN to which the PDCCH belongs and a serving cell associated with an MG SFN (namely, the MG timing is based on timing of the cell). In some embodiments, $$K = \left\lceil \left( \frac{N_{slot,offset,PDCCH}^{CA}}{2^{\mu_{offset,PDCCH}}} - \frac{N_{slot,offset,MG}^{CA}}{2^{\mu_{offset,MG}}} \right) \right\rceil$$

$$N_{slot,offset,PDCCH}^{CA}$$

is a slot offset of the serving cell to which the PDCCH belongs relative to a primary cell, and $$N_{slot,offset,MG}^{CA}$$

is a slot offset of the serving cell associated with the MG SFN relative to the primary cell.

For the serving cell associated with the MG timing, to be specific, timing of the MG start subframe is calculated based on the timing of the serving cell. The timing of the MG start subframe may be stipulated in the protocol and preconfigured by the network. In some alternative embodiments, trigger signaling indicates the timing of the MG start subframe after the timing of the MG start subframe is stipulated in the protocol and preconfigured by the network.

The gap TA is timing advance of the aperiodic MG. An actual gap start location is obtained by advancing time of the gap TA at the gap subframe start location.

In some embodiments, the gap TA may be preconfigured by the network. In some alternative embodiments, a plurality of gap TAs may be preconfigured the network or stipulated in the protocol, and trigger signaling DCI indicates one of the gap TAs.

In some embodiments, the gap TA is less than 1 ms.

In some embodiments, in a case in which the gap TA is not preconfigured, the trigger signaling does not indicate the gap TA.

Embodiment 2

This embodiment of this application shows a start location of an aperiodic MG in a case in which an offset granularity of a gap is a slot.

A gap start location is a first slot location of the gap, and is related to at least one of a slot or subframe in which DCI signaling is located, an aperiodic MG trigger offset, an SFN offset between a serving cell to which a PDCCH belongs and a serving cell associated with MG timing, the serving cell associated with the MG timing, and the like. The first slot location of the MG meets the following formula:

$$\left\lfloor ng \frac{2^{\mu_{MG}}}{2^{\mu_{PDCCH}}} \right\rfloor + X + K$$

Herein, n is a slot including DCI, and X is the aperiodic MG trigger offset (where a unit is slot, the aperiodic MG trigger offset is a slot offset between the DCI and an MG slot start point, and a numerology corresponding to the slot offset is consistent with a numerology of an active DL BWP of the serving cell associated with the MG).

In some embodiments, the offset may be preconfigured by a network or stipulated in a protocol. In some alternative embodiments, the DCI signaling indicates one offset after a plurality of offsets are preconfigured by a network or stipulated in a protocol.

$\mu_{PDCCH}$ is subcarrier spacing configuration for the PDCCH, and is subcarrier spacing configuration associated with the MG.

K is an SFN offset between a serving cell SFN to which the PDCCH belongs and a serving cell associated with an MG SFN (namely, the MG timing is based on timing of the cell). In some embodiments, $$K = \left| \left( \frac{N_{slot,offset,PDCCH}^{CA}}{2^{\mu_{offset,PDCCH}}} - \frac{N_{slot,offset,MG}^{CA}}{2^{\mu_{offset,MG}}} \right) \right|$$

$$N_{slot,offset,PDCCH}^{CA}$$

is a slot offset of the serving cell to which the PDCCH belongs relative to a primary cell, and $$N_{slot,offset,MG}^{CA}$$

is a slot offset of the serving cell associated with the MG SFN relative to the primary cell.

For the serving cell associated with the MG timing, to be specific, timing of the MG start slot is calculated based on the timing of the serving cell. The timing of the MG start slot may be stipulated in the protocol and preconfigured by the network. In some alternative embodiments, another signaling (such as DCI signaling or MAC CE signaling) indicates the timing of the MG start slot after the timing of the MG start slot is stipulated in the protocol and preconfigured by the network.

In some embodiments, when calculating the start location of the MG based on the slot, the UE does not expect to be configured/to indicate MG TA.

Embodiment 3

This embodiment of this application provides a method for a semi-persistent MG triggered by DCI.

For a location of a first MG occasion (e.g., a first periodic MG) of the semi-persistent MG (including an offset indication for the first MG occasion), refer to the Embodiment 1 or the Embodiment 2.

An offset between semi-persistent MG occasions, an MG length, and a quantity of MG occasions may be preconfigured by a network. In some alternative embodiments, DCI signaling indicates one offset, MG length, and MG occasion or a group of offsets, MG lengths, and MG occasions after a plurality of or a plurality of groups of offsets between semi-persistent MG occasions, MG lengths, and MG occasions are preconfigured by a network. After obtaining the location of the first MG occasion, the terminal obtains a location of another MG occasion based on the foregoing indication.

The semi-persistent MG herein triggered by the DCI may be understood as a special aperiodic MG triggered by the DCI.

A second network side device (such as a location server) sends a positioning measurement window (such as an MG) request to a first network side device (such as a serving gNB). In some embodiments, the positioning measurement window request may be carried by using NR positioning protocol A (NRPPa) signaling.

In some embodiments, in a case in which the terminal is configured to receive an aperiodic or semi-persistent PRS, the second network side device may send a positioning activation request (such as requesting the serving gNB to trigger/activate a periodic or semi-persistent PRS) to the first network side device. The positioning measurement window request may also be carried in the positioning activation request.

In some embodiments, the second network side device may send a positioning measurement window cancel request and/or a positioning measurement window update request to the first network side device. For request content, refer to the cancel request and/or update request sent by the terminal side.

In some embodiments, the second network side device may obtain BWP configuration from the first network side device. For BWP configuration content, refer to the foregoing descriptions. In some embodiments, the second network side device may obtain BWP switch information and/or secondary cell activation/deactivation information from the first network side device. The second network side device obtains the foregoing information from the first network side device, and the first network side device sends the information after a request of the second network side device, or the first network side device actively sends the information or sends the information in an agreed manner (for example, the first network side device sends BWP switch information and/or secondary cell activation/deactivation information to the second network side device while/before/after sending BWP switch and/or secondary cell activation/deactivation signaling to the terminal).

With reference to FIG. 2, the foregoing describes the positioning measurement window indication method according to this embodiment of this application in detail. With reference to FIG. 3, the following describes a positioning measurement window indication method according to another embodiment of this application in detail. It may be understood that an interaction between a network side device and a terminal described from the perspective of the network side device is the same as the descriptions of the terminal side in the method shown in FIG. 2. To avoid repetition, relevant descriptions are appropriately omitted.

FIG. 3 is a schematic flowchart of implementing the positioning measurement window indication method according to this embodiment of this application. The method may be applied to a first network side device (such as a serving gNB). As shown in FIG. 3, the method 300 includes the following steps.

S302: The first network side device sends first indication information, where the first indication information is used to trigger, activate, or configure a positioning measurement window the first indication information is used to cancel triggering, activation, or configuration of a positioning measurement window, or the first indication information is used to update positioning measurement window configuration.

In this step, the first network side device may send the first indication information to the terminal, and the terminal may receive the first indication information.

In this embodiment of this application, the first network side device sends the first indication information, where the first indication information may be used to trigger, activate, or configure the positioning measurement window, to quickly trigger, activate, or configure the positioning measurement window, so that the terminal may quickly perform positioning measurement in the positioning measurement window. In some alternative embodiments, the first indication information may be used to cancel triggering, activation, or configuration of the positioning measurement window, to quickly cancel a previous positioning measurement window. In some alternative embodiments, the first indication information may be used to update the positioning measurement window configuration, to quickly update the positioning measurement window configuration, so that the positioning measurement window configuration matches PRS configuration, and a PRS measurement effect is improved.

As described above, how to activate/configure/trigger the positioning measurement window in time by enabling the first network side device to obtain an approximate location of the positioning measurement window before DCI signaling for a PRS is triggered is an issue to be further addressed.

In some embodiments, before the first network side device sends the first indication information, the method further includes: receiving a first request information, where the first request information is used to assist the first network side device in configuring, activating, or triggering the positioning measurement window. The first request information may be obtained from the terminal or from the second network side device. For specific content of the first request information, refer to the foregoing embodiment.

In a case in which a currently active DL BWP matches the PRS, the terminal may measure the PRS in the active DL BWP but not in a positioning measurement window. In a case in which an active DL BWP does not match the PRS, the terminal needs to measure the PRS in a positioning measurement window.

After the PRS and the positioning measurement window are configured, if BWP switch occurs before the PRS is measured, it is likely that a switched BWP exactly matches the PRS. Because the serving gNB does not know a frequency domain location of the PRS, and the serving gNB still configures/triggers the positioning measurement window to enable the terminal to measure the PRS in the positioning measurement window, this results in invalid positioning measurement window configuration and unnecessary data interruption. This is because the terminal needs to interrupt transmission of data/control signaling in the positioning measurement window and may measure only a corresponding signal such as a signal PRS used for positioning.

Therefore, when BWP switch or secondary cell activation occurs, the terminal needs to determine whether to stop or enable the positioning measurement window. If necessary, the terminal sends a second request information to the first network side device (such as a serving gNB), to indicate that a status of the positioning measurement window needs to be changed. In some embodiments, before the first network side device sends the first indication information, the method further includes: receiving the second request information, where the second request information includes a positioning measurement window stop message or a positioning measurement window enabling message. The positioning measurement window stop message is used to assist the first network side device in stopping or cancelling a positioning measurement window. The positioning measurement window enabling message is used to assist the first network side device in enabling a positioning measurement window. The second request information may be obtained from the terminal or from the second network side device. For specific content of the second request information, refer to the foregoing embodiment.

In some embodiments, that the first network side device sends first indication information includes: The first network side device sends the first indication information to the second network side device. For example, the serving gNB sends MG configuration information to a location server, to assist the location server in performing a subsequent positioning resource indication or performing a subsequent positioning behavior. For example, when the location server learns that MG configuration does not meet an expectation, new MG configuration is requested from the gNB. In some embodiments, the serving gNB may further send an MG cancel indication and an MG update indication to the location server, to assist the location server in performing a subsequent positioning behavior.

FIG. 4 is a schematic flowchart of implementing a positioning measurement window indication method according to an embodiment of this application. The method may be applied to a second network side device (such as a location server). As shown in FIG. 4, the method 400 includes the following steps.

S402: The second network side device sends third request information, where the third request information is used to assist a first network side device in configuring, activating, or triggering a positioning measurement window. The third request information includes at least one of the following: a start location of the positioning measurement window; a time length for which the positioning measurement window takes effect; a length of the positioning measurement window; identification information of a PFL associated with the positioning measurement window; a frequency of the PIM associated with the positioning measurement window; identification information of the positioning measurement window; a type of the positioning measurement window; a request reason of the positioning measurement window; and PRS configuration information.

In this embodiment of this application, the second network side device sends the third request information, where the third request information is used to assist the first network side device in configuring, activating, or triggering the positioning measurement window. In this way, the first network side device may configure, activate, or trigger a positioning measurement window for the terminal, and the terminal is enabled to quickly perform positioning measurement in the positioning measurement window.

FIG. 5 is a schematic diagram of a structure of a positioning measurement window indication apparatus according to an embodiment of this application. The positioning measurement window indication apparatus 500 corresponds to the terminal in another embodiment. As shown in FIG. 5, the positioning measurement window indication apparatus 500 includes the following modules.

A receiving module 502 may be configured to receive first indication information, where the first indication information is used to trigger, activate, or configure a positioning measurement window, the first indication information is used to cancel triggering, activation, or configuration of a positioning measurement window, or the first indication information is used to update positioning measurement window configuration.

A positioning module 504 may be configured to perform a positioning behavior based on the first indication information.

In this embodiment of this application, the positioning measurement window indication apparatus receives the first indication information, where the first indication information may be used to trigger, activate, or configure the positioning measurement window, to quickly, trigger, activate, or configure the positioning measurement window, so that the positioning measurement window indication apparatus may quickly perform positioning measurement in the positioning measurement window. In some alternative embodiments, the first indication information may be used to cancel triggering, activation, or configuration of the positioning measurement window, to quickly cancel a previous positioning measurement window. In some alternative embodiments, the first indication information may be used to update the positioning measurement window configuration, to quickly update the positioning measurement window configuration, so that the positioning measurement window configuration matches PRS configuration, and a PRS measurement effect is improved.

In some embodiments, as an embodiment, the positioning module 504 may be configured to: in a case in which the first indication information indicates that the positioning measurement window is triggered, activated, or configured, perform positioning reference signal PRS measurement in the positioning measurement window indicated by the first indication information; in a case in which the first indication information indicates that triggering, activation, or configuration of the positioning measurement window is cancelled, cancel performing PRS measurement by using a target positioning measurement window, where the target positioning measurement window is indicated by a network side device before the first indication information is received; or in a case in which the first indication information indicates that the positioning measurement window configuration is updated, perform PRS measurement in an updated positioning measurement window indicated by the first indication information.

In some embodiments, as an embodiment, the positioning measurement window indication apparatus 500 further includes a sending module. The sending module may be configured to send first request information, where the first request information is used to assist a network side device in configuring, activating, or triggering a positioning measurement window.

In some embodiments, as an embodiment, the first request information includes at least one of the following: a request flag of the positioning measurement window; a type of the positioning measurement window; a serving cell indication associated with timing information of the requested positioning measurement window; identification information of a positioning frequency layer PFL associated with the positioning measurement window; a frequency associated with the positioning measurement window; identification information of the positioning measurement window; a relative offset of a start location of the positioning measurement window; absolute time of the start location of the positioning measurement window; a quantity of positioning measurement window occasions; a gap between the positioning measurement window occasions; PRS configuration information; and bandwidth part BWP configuration information.

In some embodiments, as an embodiment, the relative offset of the start location of the positioning measurement window includes at least one of the following: an offset of the start location of the positioning measurement window relative to a start location of a PRS sent by a serving cell; an offset of the start location of the positioning measurement window relative to a start location of a PRS window; an offset of the start location of the positioning measurement window relative to received downlink control information ICI used to trigger the PRS; an offset of the start location of the positioning measurement window relative to a pre-configured location associated with the PRS; and an offset of the start location of the positioning measurement window relative to a system frame number 0 of the serving cell.

In some embodiments, as an embodiment, the sending module is configured to send the first request information in a case in which a first timer runs or expires. A start moment of the first timer includes one of the following: a moment for determining that the PRS configuration information is obtained; a moment for receiving the PRS configuration information; a moment for completing parsing of the PRS configuration information; a moment for determining positioning information request signaling; a moment for receiving the positioning information request signaling; and a moment at which a positioning information request or PRS configuration takes effect.

In some embodiments, as an embodiment, the positioning measurement window indication apparatus 500 also includes a sending module. The sending module may be configured to send second request information. The second request information includes a positioning measurement window stop message or a positioning measurement window enabling message. The positioning measurement window stop message is used to assist a network side device in stopping or cancelling a positioning measurement window. The positioning measurement window enabling message is used to assist the network side device in enabling a positioning measurement window.

In some embodiments, as an embodiment, the positioning measurement window stop message includes at least one of the following: a stop reason or a cancel reason; identification information; identification information of an associated PFL; an associated frequency; a configuration identifier; stop time or cancel time, a BWP identifier; a serving cell identifier; and configuration information of a stopped or cancelled positioning measurement window; and/or the positioning measurement window enabling message includes at least one of the following: an enabling reason; identification information; identification information of an associated PFL; an associated frequency; a configuration identifier; enabling time; a BWP identifier; and a serving cell identifier.

In some embodiments, as an embodiment, the sending module is configured to send the second request information in a case in which a second timer runs or expires. A start moment of the second timer includes one of the following: a moment for receiving a command for BWP switch; a moment for determining that BWP switch information is obtained; a moment for completing the BWP switch; a moment for receiving a command for secondary cell activation or deactivation; a moment for determining that secondary cell activation or deactivation information is obtained; and a moment for completing the secondary cell activation or deactivation.

In some embodiments, as an embodiment, the sending module is configured to send the second request information in a case in which at least one of the following events is met: BWP switch occurs; secondary cell activation or deactivation occurs; and the second timer is running or expires.

In some embodiments, as an embodiment, the first indication information is used to cancel the triggering, activation, or configuration of the positioning measurement window. The first indication information includes at least one of the following of the positioning measurement window: a cancel flag; identification information; identification information of an associated PFL; frequency information of the associated PFL; a cancel reason; an associated common identifier; configuration information of a cancelled positioning measurement window; and stop time or cancel time.

In some embodiments, as an embodiment, the first indication information is used to update the positioning measurement window configuration. The first indication information includes at least one of the following: an update identifier of the positioning measurement window; identification information of the positioning measurement window that needs to be updated; identification information of a PFL associated with the positioning measurement window that needs to be updated; and frequency information of the PIT associated with the positioning measurement window that needs to be updated.

In some embodiments, as an embodiment, the first indication information is used to update at least one of the following of the positioning measurement window configuration: a trigger offset; a period; a length; timing advance; a relative offset of a start location of the positioning measurement window; absolute time of the start location of the positioning measurement window; a quantity of positioning measurement window occasions; and a gap between the positioning measurement window occasions.

In some embodiments, as an embodiment, the first indication information is received at a moment outside the positioning measurement window.

In some embodiments, as an embodiment, the first indication information includes cancellation of the positioning measurement window or update of the positioning measurement window. A receiving moment of the first indication information is not later than a moment for receiving signaling of triggering or activating the positioning measurement window.

In some embodiments, as an embodiment, a receiving moment of the first indication information is not later than a start moment of the positioning measurement window; or a receiving moment of the first indication information is not later than a moment that is before a start moment of the positioning measurement window and that reaches preset duration.

In some embodiments, as an embodiment, the positioning measurement window indication apparatus 500 further includes a determining module. The determining module may be configured to determine that the positioning measurement window is stopped, cancelled, or discarded in a case in which it is detected that one of the following events is met: an aperiodic CSI report overlaps with the positioning measurement window; a first channel or a first signal overlaps with the positioning measurement window; ultra reliable and low latency communication URLLC service scheduling overlaps with the positioning measurement window; DCI indicates that a flexible symbol in a slot format is uplink, and the flexible symbol overlaps with the positioning measurement window; and a second channel or a second signal that the DCI indicates the terminal to transmit overlaps with the positioning measurement window.

In some embodiments, as an embodiment, the first indication information is used to trigger, activate, or configure the positioning measurement window. An aperiodic positioning measurement window and/or a semi-persistent positioning measurement window may be configured, activated, or triggered for the positioning measurement window indication apparatus only in a case in which PRS measurement is configured for the positioning measurement window indication apparatus.

In some embodiments, as an embodiment, the receiving module 502 may be configured to receive the positioning measurement window configuration. The positioning measurement window configuration includes a positioning measurement window offset, and a granularity of the positioning measurement window offset is less than 1 millisecond.

In some embodiments, as an embodiment, the first indication information is used to trigger, activate; or configure the positioning measurement window. After receiving the first indication information, the positioning measurement window indication apparatus skips performing at least one of the following events or skips receiving signaling related to at least one of the following events: BWP switch; secondary cell activation; and secondary cell deactivation.

In some embodiments, as an embodiment; the first indication information is used to trigger, activate, or configure the positioning measurement window. A receiving moment of the first indication information is not later than a moment for receiving signaling of triggering or activating a PRS.

In some embodiments, as an embodiment, the positioning measurement window indication apparatus 500 further includes a sending module. The sending module may be configured to send the first indication information to a second network side device.

For the positioning measurement window indication apparatus 500 according to this embodiment of this application, refer to the process in the method 200 corresponding to this embodiment of this application. In addition, the units/modules in the positioning measurement window indication apparatus 500 and other operations and/or functions are respectively intended to implement corresponding procedures in the method 200 and achieve a same or equivalent technical effect. For brevity, details are not described herein again.

The positioning measurement window indication apparatus in this embodiment of this application may be an apparatus, or may be a component, integrated circuit, or chip in a terminal. The apparatus may be a mobile terminal or a non-mobile terminal. For example, the mobile terminal may include but is not limited to the types of the terminals 11 listed above. The non-mobile terminal may be a server, a Network Attached Storage (NAS), a Personal Computer (PC), a Television (TV), a teller machine, or a self-service machine. This is not specifically limited in this embodiment of this application.

The positioning measurement window indication apparatus in this embodiment of this application may be an apparatus having an operating system. The operating system may be an Android operating system, an iOS operating system, or another possible operating system. This is not specifically limited in this embodiment of this application.

The positioning measurement window indication apparatus provided in this embodiment of this application can implement the processes in the method embodiment in FIG. 2 and achieve a same technical effect. To avoid repetition, details are not described herein again.

Figure 6:
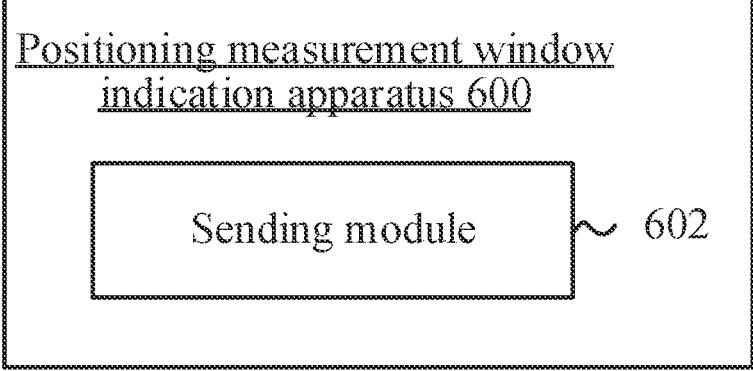
FIG. 6 is a schematic diagram of a structure of a positioning measurement window indication apparatus according to an embodiment of this application.

FIG. 6 is a schematic diagram of a structure of a positioning measurement window indication apparatus according to an embodiment of this application. The positioning measurement window indication apparatus 600 corresponds to the first network side device in another embodiment. The positioning measurement window indication apparatus 600 may be a gNB. As shown in FIG. 6, the positioning measurement window indication apparatus 600 includes the following modules.

A sending module 602 may be configured to send first indication information, where the first indication information is used to trigger, activate, or configure a positioning measurement window, the first indication information is used to cancel triggering, activation, or configuration of a positioning measurement window, or the first indication information is used to update positioning measurement window configuration.

In this embodiment of this application, the positioning measurement window indication apparatus sends the first indication information, where the first indication information may be used to trigger, activate, or configure the positioning measurement window, to quickly trigger, activate, or configure the positioning measurement window, so that the positioning measurement window indication apparatus can quickly perform positioning measurement in the positioning measurement window. In some alternative embodiments, the first indication information may be used to cancel triggering, activation, or configuration of the positioning measurement window, to quickly cancel a previous positioning measurement window. In some alternative embodiments, the first indication information may be used to update the positioning measurement window configuration, to quickly update the positioning measurement window configuration, so that the positioning measurement window configuration matches PRS configuration, and a PRS measurement effect is improved.

In some embodiments, the positioning measurement window indication apparatus 600 further includes a receiving module. The receiving module may be configured to send first request information, where the first request information is used to assist a first network side device in configuring, activating, or triggering a positioning measurement window. The first request information may be obtained from the terminal or from the second network side device. For specific content of the first request information, refer to the foregoing embodiment.

In some embodiments, the positioning measurement window indication apparatus 600 also includes a receiving module. The receiving module may be configured to send second request information. The second request information includes a positioning measurement window stop message or a positioning measurement window enabling message. The positioning measurement window stop message is used to assist a first network side device in stopping or cancelling a positioning measurement window. The positioning measurement window enabling message is used to assist the first network side device in enabling a positioning measurement window. The second request information may be obtained from the terminal or from the second network side device. For specific content of the second request information, refer to the foregoing embodiment.

In some embodiments, the sending module 602 may be configured to send the first indication information to a second network side device.

For the positioning measurement window indication apparatus 600 according to this embodiment of this application, refer to the process in the method 300 corresponding to this embodiment of this application. In addition, the units/modules in the positioning measurement window indication apparatus 600 and other operations and/or functions are respectively intended to implement corresponding procedures in the method 300 and achieve a same or equivalent technical effect. For brevity, details are not described herein again.

Figure 7:
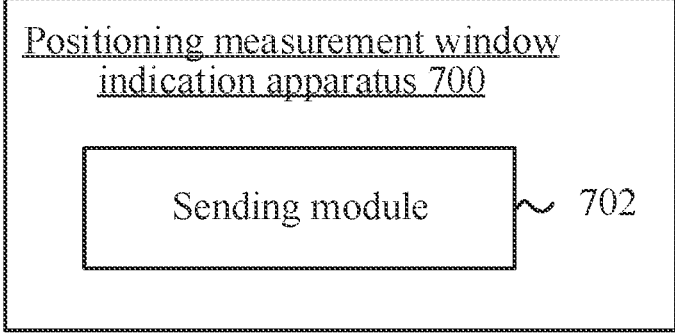
FIG. 7 is a schematic diagram of a structure of a positioning measurement window indication apparatus according to an embodiment of this application.

FIG. 7 is a schematic diagram of a structure of a positioning measurement window indication apparatus according to an embodiment of this application. The positioning measurement window indication apparatus 700 corresponds to the second network side device in another embodiment. The positioning measurement window indication apparatus 700 may be a location server. As shown in FIG. 7, the positioning measurement window indication apparatus 700 includes the following modules.

A sending module 702 may be configured to send third request information, where the third request information is used to assist a first network side device in configuring, activating, or triggering a positioning measurement window. The third request information includes at least one of the following: a start location of the positioning measurement window; a time length for which the positioning measurement window takes effect; a length of the positioning measurement window; identification information of a PFL associated with the positioning measurement window; a frequency of the PFL associated with the positioning measurement window; identification information of the positioning measurement window; a type of the positioning measurement window; a request reason of the positioning measurement window; and PRS configuration information.

In this embodiment of this application, the positioning measurement window indication apparatus sends the third request information, where the third request information is used to assist the first network side device in configuring, activating, or triggering the positioning measurement window. In this way, the first network side device may configure, activate, or trigger a positioning measurement window for the terminal, and the terminal is enabled to quickly perform positioning measurement in the positioning measurement window.

For the positioning measurement window indication apparatus 700 according to this embodiment of this application, refer to the process in the method 400 corresponding to this embodiment of this application. In addition, the units/modules in the positioning measurement window indication apparatus 700 and other operations and/or functions are respectively intended to implement corresponding procedures in the method 400 and achieve a same or equivalent technical effect. For brevity, details are not described herein again.

Figures 8, 9:
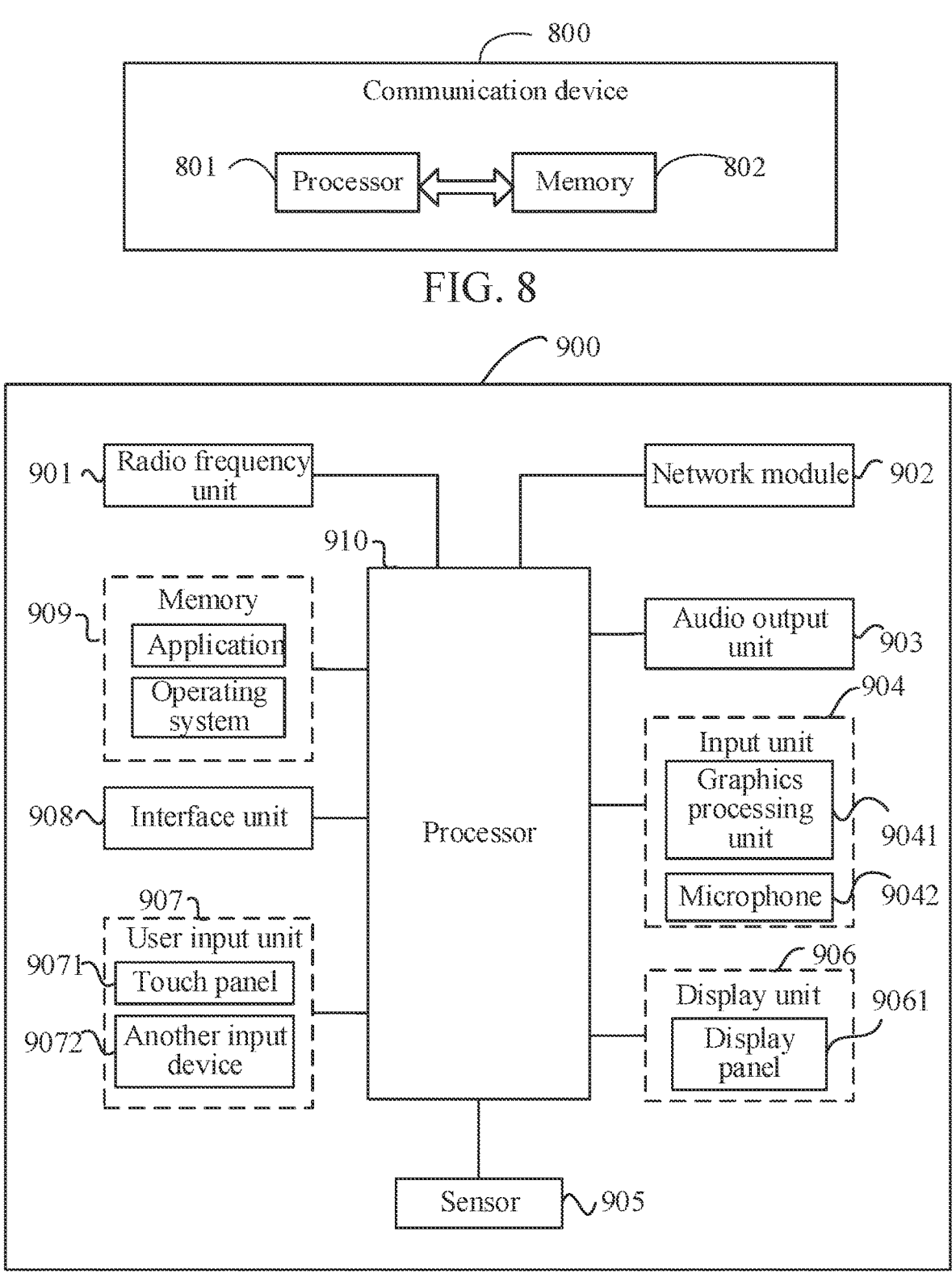
FIG. 8 is a schematic diagram of a structure of a communication device according to an embodiment of this application.
FIG. 9 is a schematic diagram of a structure of a terminal according to an embodiment of this application.

In some embodiments, as shown in FIG. 8, an embodiment of this application further provides a communication device 800, including a processor 801, a memory 802, and a program or instructions that is are stored in the memory 802 and that may be run on the processor 801. For example, in a case in which the communication device 800 is a terminal, the program or the instructions is/are executed by the processor 801, to implement the processes of the foregoing positioning measurement window indication method embodiment and achieve a same technical effect. In a case in which the communication device 800 is a network side device, the program or the instructions is/are executed by the processor 801; to implement the processes of the foregoing positioning measurement window indication method embodiments and achieve a same technical effect. To avoid repetition, details are not described herein again.

FIG. 9 is a schematic diagram of a hardware structure of a terminal that implements an embodiment of this application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the terminal 900 may further include a power supply (such as a battery) that supply power to the components. The power supply may be logically connected to the processor 910 by using a power management system, to realize functions such as charging management, discharging management, and power consumption management by using the power management system. The terminal structure shown in FIG. 9 constitutes no limitation on the terminal. The terminal may include more or fewer components than those shown in the figure, combine some components, or may have different component arrangements. Details are not described herein again.

It should be understood that, in this embodiment of this application, the input unit 904 may include a Graphics Processing Unit (GPU) 9041 and a microphone 9042. The graphics processing unit 9041 processes a static picture or image data of a video obtained by using an image capture apparatus (such as a camera) in a video capture mode or an image capture mode. The display unit 906 may include a display panel 9061. The display panel 9061 may be configured in a form of a liquid crystal display, an organic light emitting diode, or the like. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but are not limited to a physical keyboard, a function button (for example, a volume control button or a switch button), a trackball, a mouse, and a joystick. Details are not described herein again.

In this embodiment of this application, the radio frequency unit 901 receives downlink data from a network side device, and sends the downlink data to the processor 910 for processing. In addition, the radio frequency unit 901 sends uplink data to the network side device. The radio frequency unit 901 usually includes but is not limited to an antenna, at least one amplifier, a transceiver, a coupler, a low noise amplifier, and a duplexer.

The memory 909 may be configured to store a software program or instructions and various data. The memory 909 may mainly include a program or instruction storage area and a data storage area. The program or instruction storage area may store an operating system, an application required by at least one function (for example, a sound play function or an image play function), or the like. In addition, the memory 909 may include a high-speed random access memory, or may include a nonvolatile memory. The nonvolatile memory may be a Read-Only Memory (ROM), a Programmable ROM (PROM), an Erasable PROM (EPROM), an Electrically EPROM (EEPROM), or a flash memory. For example, the nonvolatile memory may be at least one magnetic disk storage device, a flash storage device, or another nonvolatile solid-state storage device.

The processor 910 may include one or more processing units. In some embodiments, the processor 910 may integrate an application processor and a modem processor. The application processor mainly processes an operating system, a user interface, and an application program or instruction, and the modem processor mainly processes wireless communication, such as a baseband processor. It may be understood that the modem processor may not be integrated into the processor 910.

The radio frequency unit 901 is configured to receive first indication information, where the first indication information is used to trigger, activate, or configure a positioning measurement window, the first indication information is used to cancel triggering, activation, or configuration of a positioning measurement window, or the first indication information is used to update positioning measurement window configuration. The processor 910 is configured to perform a positioning behavior based on the first indication information.

In this embodiment of this application, the terminal receives the first indication information, where the first indication information may be used to trigger, activate, or configure the positioning measurement window, to quickly trigger, activate, or configure the positioning measurement window, so that the terminal may quickly perform positioning measurement in the positioning measurement window. In some alternative embodiments, the first indication information may be used to cancel triggering, activation, or configuration of the positioning measurement window, to quickly cancel a previous positioning measurement window. In some alternative embodiments, the first indication information may be used to update the positioning measurement window configuration, to quickly update the positioning measurement window configuration, so that the positioning measurement window configuration matches PRS configuration, and a PRS measurement effect is improved.

The terminal 900 provided in this embodiment of this application may further implement processes of the foregoing positioning measurement window indication method embodiments, and can achieve a same technical effect. To avoid repetition, details are not described herein again.

Figure 10:
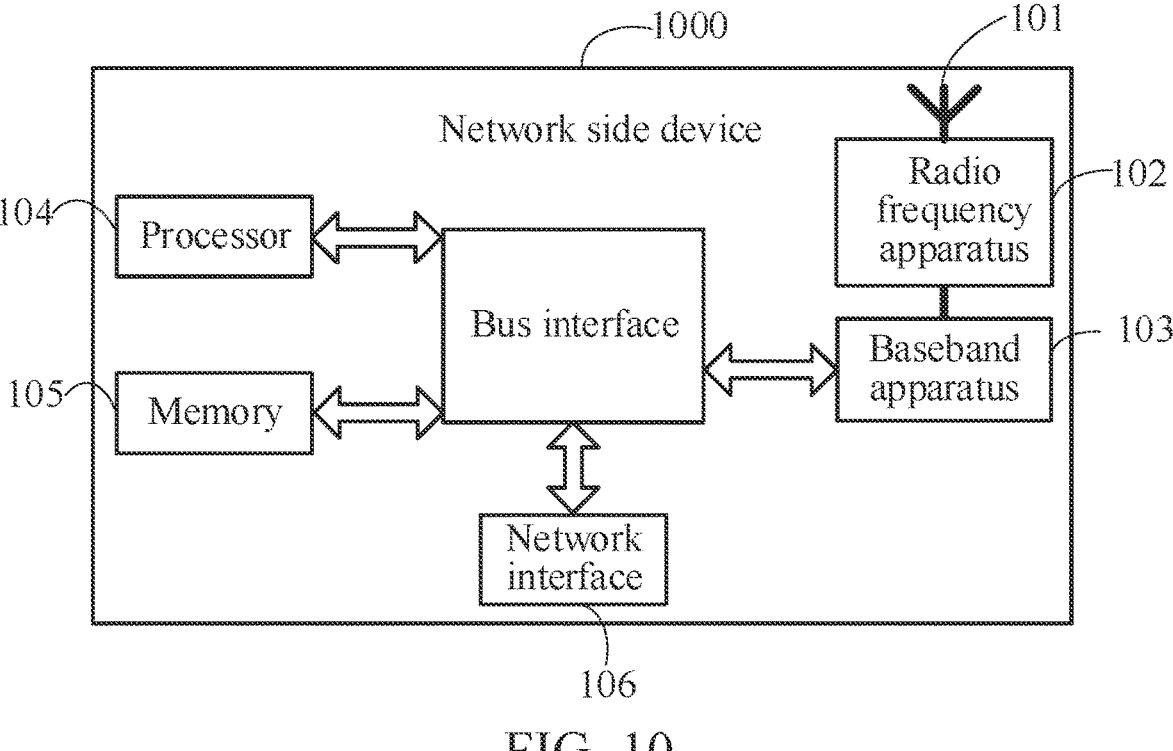
FIG. 10 is a schematic diagram of a structure of a network side device according to an embodiment of this application.

For example, an embodiment of this application further provides a network side device. As shown in FIG. 10, the network side device 1000 includes an antenna 101, a radio frequency apparatus 102, and a baseband apparatus 103. The antenna 101 is connected to the radio frequency apparatus 102. In an uplink direction, the radio frequency apparatus 102 receives information through the antenna 101, and sends the received information to the baseband apparatus 103 for processing. In a downlink direction, the baseband apparatus 103 processes the information to be sent and sends the information to the radio frequency apparatus 102. The radio frequency apparatus 102 processes the received information and sends the information through the antenna 101.

The foregoing frequency band processing apparatus may be located in the baseband apparatus 103, and the method performed by the network side device in the foregoing embodiments may be implemented in the baseband apparatus 103. The baseband apparatus 103 includes a processor 104 and a memory 105.

The baseband apparatus 103 may include, for example, at least one baseband board. A plurality of chips are disposed on the baseband board. As shown in FIG. 10, one of the chips is, for example, the processor 104. The processor 104 is connected to the memory 105 to invoke a program in the memory 105, to perform an operation of the network side device shown in the foregoing method embodiment.

The baseband apparatus 103 may further include a network interface 106, used to exchange information with the radio frequency apparatus 102. The interface is, for example, a Common Public Radio Interface (CPRI).

For example, the network side device in this embodiment of this application further includes instructions or a program that are/is stored in the memory 105 and that may be run on the processor 104. The processor 104 invokes the instructions or the program in the memory 105 to perform the methods performed by modules shown in FIG. 6 and FIG. 7, and achieve a same technical effect. To avoid repetition, details are not described herein again.

An embodiment of this application further provides a readable storage medium. The readable storage medium may be volatile or nonvolatile. The readable storage medium stores a program or instructions. When the program or the instructions is/are executed by a processor, processes of the foregoing positioning measurement window indication method embodiments are implemented, and a same technical effect can be achieved. To avoid repetition, details are not described herein again.

The processor may be the processor in the terminal described in the foregoing embodiment. The readable storage medium includes a computer-readable storage medium, such as a computer ROM, a Random Access Memory (RAM), a magnetic disk, or an optical disc.

An embodiment of this application further provides a chip. The chip includes a processor and a communication interface, where the communication interface is coupled to the processor. The processor is configured to run a program or instructions, to implement processes of the foregoing positioning measurement window indication method embodiments, and can achieve a same technical effect. To avoid repetition, details are not described herein again.

It should be understood that the chip mentioned in this embodiment of this application may also be referred to as a system on a chip, a system chip, a chip system, or a system on a chip.

An embodiment of this application further provides a computer program product. The computer program product is stored in a non-transient storage medium. The computer program product is executed by at least one processor to perform processes of the foregoing positioning measurement window indication method embodiments, and can achieve a same technical effect. To avoid repetition, details are not described herein again.

An embodiment of this application further provides a communication device, configured to perform processes of the foregoing positioning measurement window indication method embodiments, and can achieve a same technical effect. To avoid repetition, details are not described herein again.

It should be noted that, in this specification, the term "comprise", "include", or any other variants are intended to cover a non-exclusive inclusion, so that a process, a method, an article or an apparatus that includes a list of elements not only includes those elements but also includes other elements which are not expressly listed, or further includes elements inherent to such a process, method, article or apparatus. Without further limitation, the element defined by the sentence "including a . . . " does not exclude that other identical elements are also present in the process, method, article or apparatus including the element. In addition, it should be noted that the scope of the method and apparatus in embodiments of this application is not limited to performing a function in a shown or discussed sequence, or may include performing a function in a basically simultaneous manner or in a reverse sequence based on an involved function. For example, the described method may be performed in a sequence different from the described sequence, and various steps may be added, omitted, or combined. In addition, features described with reference to specific examples may be combined in another example.

Based on the foregoing descriptions of the implementations, a person skilled in the art may clearly understand that the methods in the foregoing embodiments may be implemented by using software and a necessary general hardware platform, or may be implemented by using hardware. However, in many cases, the former is a better implementation. Based on such an understanding, the technical solutions in this application essentially or the part contributing to the existing technology may be implemented in a form of a software product. The computer software product is stored in a storage medium (such as a ROM/RAM, a magnetic disk, or an optical disc), and includes several instructions for instructing a computer device (which may be a mobile phone, a computer, a server, an air conditioner, or a network side device) to perform the methods in embodiments of this application.

Embodiments of this application is described with reference to the accompanying drawings, but this application is not limited to the specific embodiments described above. The specific embodiments described above are only examples, but not limitations. With enlightenment of this application, a person of ordinary skill in the art may make many forms that fall within the protection scope of this application without departing from the protection scope of a purpose and claims of this application.

What is claimed is:

1. A positioning measurement window indication method, comprising:
receiving, by a terminal, first indication information, wherein:
the first indication information is used to activate a positioning measurement window, wherein the positioning measurement window comprises a Measurement Gap (MG), and the first indication information is carried in activation signaling, wherein a MG configuration is indicated in the activation signaling; and
performing a positioning behavior based on the first indication information.

2. The positioning measurement window indication method according to claim 1, wherein the performing a positioning behavior based on the first indication information comprises:
in a case in which the first indication information indicates that the positioning measurement window is activated, performing Positioning Reference Signal (PRS) measurement in the positioning measurement window indicated by the first indication information.

3. The positioning measurement window indication method according to claim 1, wherein before receiving, by the terminal, the first indication information, the method further comprises:
sending first request information, wherein the first request information is used to assist a network side device in activating a positioning measurement window.

4. The positioning measurement window indication method according to claim 3, wherein the first request information comprises at least one of the following:
a request flag of the positioning measurement window;
a type of the positioning measurement window;
a serving cell indication associated with timing information of the requested positioning measurement window;
identification information of a Positioning Frequency Layer (PFL) associated with the positioning measurement window;
a frequency associated with the positioning measurement window;

identification information of the positioning measurement window;

a relative offset of a start location of the positioning measurement window;

absolute time of a start location of the positioning measurement window;

a quantity of positioning measurement window occasions;

a gap between the positioning measurement window occasions;

PRS configuration information; or

Bandwidth Part (BWP) configuration information.

5. The positioning measurement window indication method according to claim 4, wherein the relative offset of the start location of the positioning measurement window comprises at least one of the following:

an offset of the start location of the positioning measurement window relative to a start location of a PRS sent by a serving cell;

an offset of the start location of the positioning measurement window relative to a start location of a PRS window;

an offset of the start location of the positioning measurement window relative to received Downlink Control Information (DCI) used to trigger the PRS;

an offset of the start location of the positioning measurement window relative to a pre-configured location associated with the PRS; or an offset of the start location of the positioning measurement window relative to a system frame number 0 of the serving cell.

6. The positioning measurement window indication method according to claim 3, wherein the sending first request information comprises: sending the first request information in a case in which a first timer runs or expires, wherein a start moment of the first timer comprises one of the following:

a moment for determining that the PRS configuration information is obtained;

a moment for receiving the PRS configuration information;

a moment for completing parsing of the PRS configuration information;

a moment for determining positioning information request signaling;

a moment for receiving the positioning information request signaling; or a moment at which a positioning information request or PRS configuration takes effect.

7. The positioning measurement window indication method according to claim 1, wherein the first indication information is received at a moment outside the positioning measurement window.

8. The positioning measurement window indication method according to claim 1, further comprising: performing, by the terminal, a positioning behavior based on MG preconfiguration information and the first indication information.

9. The positioning measurement window indication method according to claim 8, wherein the MG preconfiguration information comprises a plurality of MG configurations, wherein each MG configuration corresponds to one MG configuration ID.

10. The positioning measurement window indication method according to claim 1, wherein before receiving the first indication information, the method further comprises: receiving MG preconfiguration information, comprising at least one of the following:

a relative offset of an MG start location, an MG period,

MG identification information, an MG type, a serving cell indication associated with MG timing, an MG occasion length or an MG length, the quantity of MG occasions, a gap between the MG occasions, MG timing advance (TA), or MG usage.

11. The positioning measurement window indication method according to claim 1, further comprising receiving MG deactivation signaling, wherein the MG deactivation signaling comprises at least one of the following:

MG identification information, or a deactivation identifier.

12. A positioning measurement window indication method, comprising:

sending, by a network side device, first indication information, wherein:

the first indication information is used to activate a positioning measurement window, wherein the positioning measurement window comprises a Measurement Gap (MG), and the first indication information is carried in activation signaling, wherein a MG configuration is indicated in the activation signaling.

13. The positioning measurement window indication method according to claim 12, wherein the activation signaling is carried in Media Access Control-Control Element (MAC CE).

14. The positioning measurement window indication method according to claim 12, wherein before sending, by the network side device, the first indication information, the method further comprises:

receiving first request information, wherein the first request information is used to assist the network side device in activating a positioning measurement window.

15. The positioning measurement window indication method according to claim 14, wherein the first request information comprises at least one of the following:

a request flag of the positioning measurement window;

a type of the positioning measurement window;

a serving cell indication associated with timing information of the requested positioning measurement window;

identification information of a Positioning Frequency Layer (PFL) associated with the positioning measurement window;

a frequency associated with the positioning measurement window;

identification information of the positioning measurement window;

a relative offset of a start location of the positioning measurement window;

absolute time of a start location of the positioning measurement window;

a quantity of positioning measurement window occasions;

a gap between the positioning measurement window occasions;

PRS configuration information; or

Bandwidth Part (BWP) configuration information.

16. The positioning measurement window indication method according to claim 15, wherein the relative offset of the start location of the positioning measurement window comprises at least one of the following:

an offset of the start location of the positioning measurement window relative to a start location of a PRS sent by a serving cell;

an offset of the start location of the positioning measurement window relative to a start location of a PRS window;

an offset of the start location of the positioning measurement window relative to received Downlink Control Information (DCI) used to trigger the PRS;

an offset of the start location of the positioning measurement window relative to a pre-configured location associated with the PRS; or an offset of the start location of the positioning measurement window relative to a system frame number 0 of the serving cell.

17. A terminal, comprising a processor; a memory having a computer program or an instruction stored thereon, wherein the computer program or the instruction, when executed by the processor, causes the processor to perform a positioning measurement window indication method, comprising:

receiving first indication information, wherein:

the first indication information is used to activate a positioning measurement window, wherein the positioning measurement window comprises a Measurement Gap (MG), and the first indication information is carried in activation signaling, wherein a MG configuration is indicated in the activation signaling; and performing a positioning behavior based on the first indication information.

18. The positioning measurement window indication method according to claim 1, wherein the activation signaling is carried in Media Access Control-Control Element (MAC CE).

* * * * *